United States Patent [19]
Miyatake et al.

[11] Patent Number: 5,712,693
[45] Date of Patent: Jan. 27, 1998

[54] LIGHT VALVE AND DISPLAY SYSTEM WITH A SUBSTRATE HAVING PARTICULAR RELATIONSHIP BETWEEN ITS CENTRAL THICKNESS, DISPLAY AREA DIAMETER, AND REFRACTIVE INDEX

[75] Inventors: Yoshito Miyatake; Hiroshi Takahara, both of Neyagawa; Hideki Ohmae, Suita, all of Japan

[73] Assignee: Matsushita Electric Industrial Co., Ltd., Kadoma, Japan

[21] Appl. No.: 601,534

[22] Filed: Feb. 14, 1996

Related U.S. Application Data

[63] Continuation of Ser. No. 70,999, Jun. 4, 1993, abandoned.

[30] Foreign Application Priority Data

Jun. 5, 1992 [JP] Japan ................................. 4-145277

[51] Int. Cl.[6] ........................... G02F 1/1335; G02F 1/13; G02F 1/1333
[52] U.S. Cl. ........................ 349/5; 349/1; 349/57; 349/158; 349/137
[58] Field of Search ........................... 359/40, 41, 42, 359/82; 349/1, 5, 57, 158, 159, 137

[56] References Cited

U.S. PATENT DOCUMENTS

| | | | |
|---|---|---|---|
| 4,856,869 | 8/1989 | Sakata et al. | 350/162.18 |
| 5,056,912 | 10/1991 | Hamada et al. | 349/5 |
| 5,161,042 | 11/1992 | Hamada | 359/40 |
| 5,260,815 | 11/1993 | Takizawa | 359/41 |
| 5,359,440 | 10/1994 | Hamada et al. | 359/40 |
| 5,394,254 | 2/1995 | Cheng | 359/40 |

FOREIGN PATENT DOCUMENTS

| | | |
|---|---|---|
| 0 122 737 | 10/1984 | European Pat. Off. |
| 5-15247 | 3/1993 | Japan. |

OTHER PUBLICATIONS

Patent Abstracts of Japan, vol. 15, No. 165 (E–1061) Apr. 25, 1991.

J. Pirs et al., "Low–Loss High–Intensity Color Projection", *SID International Symposium—Digest of Technical Papers*, 1988, Anaheim, CA, pp. 227–230.

Patent Abstracts of Japan, vol. 004, No. 160 (P–035) Nov. 8, 1980.

"Polymer–dispersed liquid crystal devices with curved surfaces", *Research Disclosure* No. 304, Aug. 1989, New York, pp. 559–561.

Patent Abstracts of Japan, vol. 10, No. 290 (P–503) Oct. 2, 1986.

*Primary Examiner*—Anita Pellman Gross
*Attorney, Agent, or Firm*—Wenderoth, Lind & Ponack

[57] ABSTRACT

A light valve includes a light valve layer for forming an optical image as variations in its ability to scatter light, and two substrates between which the light valve layer is sandwiched and at least one of which is transparent. The light valve satisfies the following condition:

$$t \geq \frac{d}{4} \sqrt{n^2 - 1}$$

where t denotes a central thickness of the at least one of the substrates, n denotes a refractive index of the at least one of the substrates and d denotes a maximum diameter of an effective display area of the light valve layer. Alternatively, a transparent plate can be optically coupled to one of the substrates by a transparent body. In this case, the same condition is satisfied except that the thickness refers to a central thickness from a face of the transparent plate remote from the transparent body to the light valve layer.

50 Claims, 17 Drawing Sheets

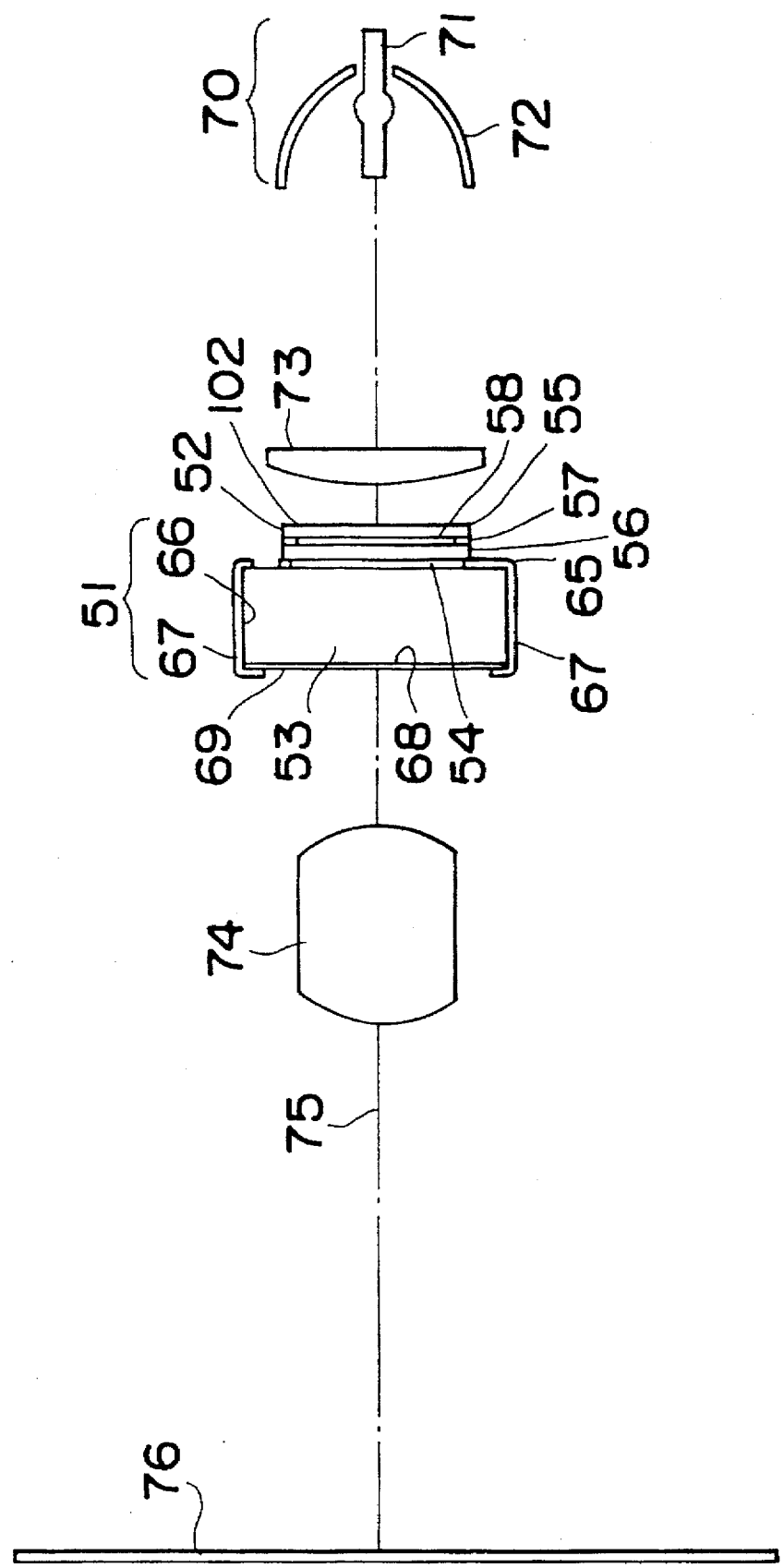

LIGHT VALVE AND DISPLAY SYSTEM WITH A SUBSTRATE HAVING PARTICULAR RELATIONSHIP BETWEEN ITS CENTRAL THICKNESS, DISPLAY AREA DIAMETER, AND REFRACTIVE INDEX

This application is a Continuation of now abandoned application Ser. No. 08/070,999, filed Jun. 4, 1993.

BACKGROUND OF THE INVENTION

1. Field of the Invention

The present invention relates to a light valve for forming an optical image as variations in its ability to scattering light and a display system using the light valve.

2. Description of the Prior Art

In order to obtain an image on a large screen, a method has been well known in which an optical image corresponding to an image signal is formed on a light valve, light irradiates the optical image, and the optical image is enlarged by a projection lens and projected onto the screen. Recently, a projection display system employing a liquid crystal panel as the light valve has attracted much attention.

Various kinds of liquid crystal panels are known in which their optical characteristics, such as optical orientation, birefringence, ability to scatter light and light absorption, change under different electrical stimuli. A projection display system based on a phenomenon in which the orientation of axes of twisted nematic (TN) liquid crystals changes in the presence of an electric field is already commercially available. A liquid crystal panel employing TN liquid crystals should be provided, at its input and output sides, with a pair of polarizers for modulating light, respectively, whereby there is a low efficiency of utilization of light. Meanwhile, TN liquid crystals are required to be oriented in a predetermined state. Thus, an alignment film should be provided and is required to be rubbed to align the crystals. Liquid crystal panels for forming an optical image by changing the condition under which light will be scattered employ, for example, a thermal writing mode, a dynamic scattering mode, polymer dispersion liquid crystal and ferroelectric liquid crystal. Furthermore, it is known that the state under which translucent ceramics "PLZT", which is obtained by adding lanthanum oxide to a solid solution of zircon lead titanate, will scatter light can also be changed. Liquid crystal panels having a changeable light scattering state can be expected to have a large optical output due to their obviating the need for a polarizer, in contrast with TN liquid crystal panels, in order to modulate light and can be produced relatively easily owing to their elimination of the need for rubbing an alignment film.

FIGS. 17(a) and 17(b) show the basic structure and operational principle of a known polymer dispersion liquid crystal panel. A polymer dispersion liquid crystal layer 3 is sandwiched between glass substrates 1 and 2 each having a thickness of about 1 mm. Transparent electrodes 4 and 5 are provided on inner faces of the glass substrates 1 and 2, respectively. In the polymer dispersion liquid crystal layer 3, liquid crystals 7 in the form of water drops are dispersed in polymer resin 8. The refractive index for ordinary rays of the liquid crystals 7 is substantially identical with that of the polymer resin 8.

When no voltage is applied to the liquid crystal layer 3, liquid crystal molecules 9 of the liquid crystals 7 are oriented at random as shown in FIG. 17(a). When a light ray 10 is perpendicularly incident upon the liquid crystal layer 3 at this time, the light ray 10 experiences different refractive indices at a boundary between the liquid crystal 7 and the polymer resin 8. Therefore, the light ray 10 repeatedly refracted at the boundaries and then, is outputted as scattered light.

On the contrary, when a sufficiently high voltage is applied to the liquid crystal layer 3, the liquid crystal molecules 9 of the liquid crystals 7 are oriented in a direction perpendicular to the glass substrates 1 and 2 as shown in FIG. 17 (b). As a result, the refractive index experienced by the light ray 10 in the liquid crystals 7 becomes identical with that in the polymer resin 8 and thus, the light ray 10 proceeds linearly without being scattered so as to be outputted.

FIG. 18 shows one example of a prior art projection display system employing a polymer dispersion liquid crystal panel. Light emitted from a lamp 11 is converged by a concave mirror 12 so as to be incident upon a liquid crystal panel 13. The liquid crystal panel 13 is a polymer dispersion liquid crystal panel and includes a polymer dispersion liquid crystal layer 17 sandwiched between glass substrates 15 and 16. Pixel electrodes are provided in a matrix on one face of each of the glass substrates 15 and 16 adjacent to the liquid crystal, layer 17.

Hence, an optical image corresponding to an image signal can be formed, as variations in the state of the layer 17, on the liquid crystal panel 13. Since all light rays emitted from the pixels subjected to a sufficiently high voltage are incident upon a projection lens 14 and reach a screen 21, bright regions are displayed at corresponding positions on the screen 21. On the other hand, since scattered light rays are emitted from pixels not subjected to the voltage and only a portion of the scattered light rays is incident upon the projection lens 14, dark regions are displayed at corresponding positions on the screen 21. Note, the optical image formed on the liquid crystal panel 13 is projected onto the screen 21 at an enlarged scale by the projection lens 14.

In order to convert the optical image formed on the light valve into regions of varying luminance, only light rays propagating within a predetermined solid angle are taken from the light valve. The quantity of light within the solid angle depends upon the degree to which the light is scattered by the light valve. To this end, a central shielding method and an aperture method can be used. In the central shielding method, light is shielded in a transparent state of the light valve so as to be prevented from reaching the screen. When the light valve is in the light scattering state, light rays which are not shielded by a shielding plate reach the screen. In the aperture method, light having directivity in a central direction is utilized and the quantity of such light transmitted to the projection lens from the pixels of the liquid crystal panel decreases as the degree to which the light is scattered increases. The central shielding method provides a projected image having excellent contrast but has drawbacks in that the structure of the apparatus for carrying out the method is complex and the projected image is dark.

The aperture method can be carried out by apparatus having a simple structure and can produce a bright projected image. However, the aperture method poses a problem in that the contrast of the projected image is poor in comparison with those produced using the central shielding method and a method employing TN liquid crystal. The same is true with respect to the light valve for forming the optical image based on variations in the light scattering state of the light valve. In order to overcome this problem, the solid angle in which light is converged towards the projection lens could be reduced. However, this measure leads to a decrease in brightness of the projected image.

Meanwhile, video cameras must be compact and lightweight to facilitate their portability. In order to make a video camera compact, a liquid crystal panel is employed in its viewfinder system. If TN liquid crystal is used for the liquid crystal panel, two polarizers are employed. Since the efficiency of such optics in their utilization of light is low, the power consumption of the light source must be high and thus, the light source, which is powered by rechargeable batteries, can be used continuously for only a short period of time before the batteries must be recharged. A polymer dispersion liquid crystal panel having high efficiency in its utilization of light could be employed in the viewfinder system to overcome this problem. However, in this case, a problem arises in that the polymer dispersion liquid crystal panel provides an image having poor contrast.

SUMMARY OF THE INVENTION

Accordingly, an essential object of the present invention is to provide a display system, a projection display system and a viewfinder system employing a light valve for forming an optical image as variations in its ability to scatter light, which are capable of displaying an image having excellent contrast.

A light valve of the present invention comprises a light valve layer for forming an optical image as variations in its ability to scatter light and two substrates between which the light valve layer is sandwiched and at least one of which is transparent, and satisfying the following condition:

$$t \geq \frac{d}{4} \sqrt{n^2 - 1}$$

where t denotes a central thickness of the one of the substrates, n denotes a refractive index of the one of the substrates and d denotes a maximum diameter of an effective display area of the light valve layer.

Another light valve apparatus of the present invention comprises a light valve layer for forming an optical image as variations in its ability to scatter light, two substrates between which the light valve layer is sandwiched and at least one of which is transparent, a transparent plate which is provided so as to confront the one of the substrates and a transparent body for optically coupling the one of the substrates and the transparent plate.

A face of the one of the substrates, which is held in contact with air, may have a concave surface.

Meanwhile, in the above described arrangements, if a light reflecting means is provided on a face of each of the one of the substrates, the transparent plate and the transparent body, which is held in contact with the light valve layer, a reflection type light valve apparatus can be obtained.

In the above arrangements, a light absorbing means is preferably provided on an ineffective face of each of the one of the substrates, the transparent plate and the transparent body, while an anti-reflection means is provided on an effective area of each of a face of the one of the substrates in contact with air, a face of the transparent plate in contact with air and the concave surface. If a positive lens is provided in close vicinity to the concave surface, uniformity of the image quality is improved.

Meanwhile, a projection display system of the present invention comprises a light source, a light valve which receives light emitted from the light source so as to form an optical image as variations in its ability to scatter light and a projection lens for projecting the optical image onto a screen. The above-mentioned light valve is used as the light valve apparatus of the projection display system.

Furthermore, a viewfinder system of the present invention comprises a light source, a light valve apparatus which receives light emitted from the light source so as to form an optical image as variations in its ability to scatter light and a magnifying lens for forming a virtual image of the optical image. The light valve referred to above is used as the light valve of the viewfinder system.

In addition, a display system of the present invention comprises a light source and a light valve which receives light emitted from the light source so as to form an optical image as variations in its ability to scatter light. The above described light valve apparatus is used as the light valve apparatus of the display system.

BRIEF DESCRIPTION OF THE DRAWINGS

These and other objects and features of the present invention will become more apparent from the following description of the preferred embodiments thereof made with reference to the accompanying drawings, in which:

FIG. 6 is a schematic diagram of a first embodiment of a projection display system according to the present invention;

Before the description of the present invention proceeds, it is to be noted that like parts are designated by like reference numerals throughout the accompanying drawings.

DETAILED DESCRIPTION OF THE INVENTION

Figure 1:
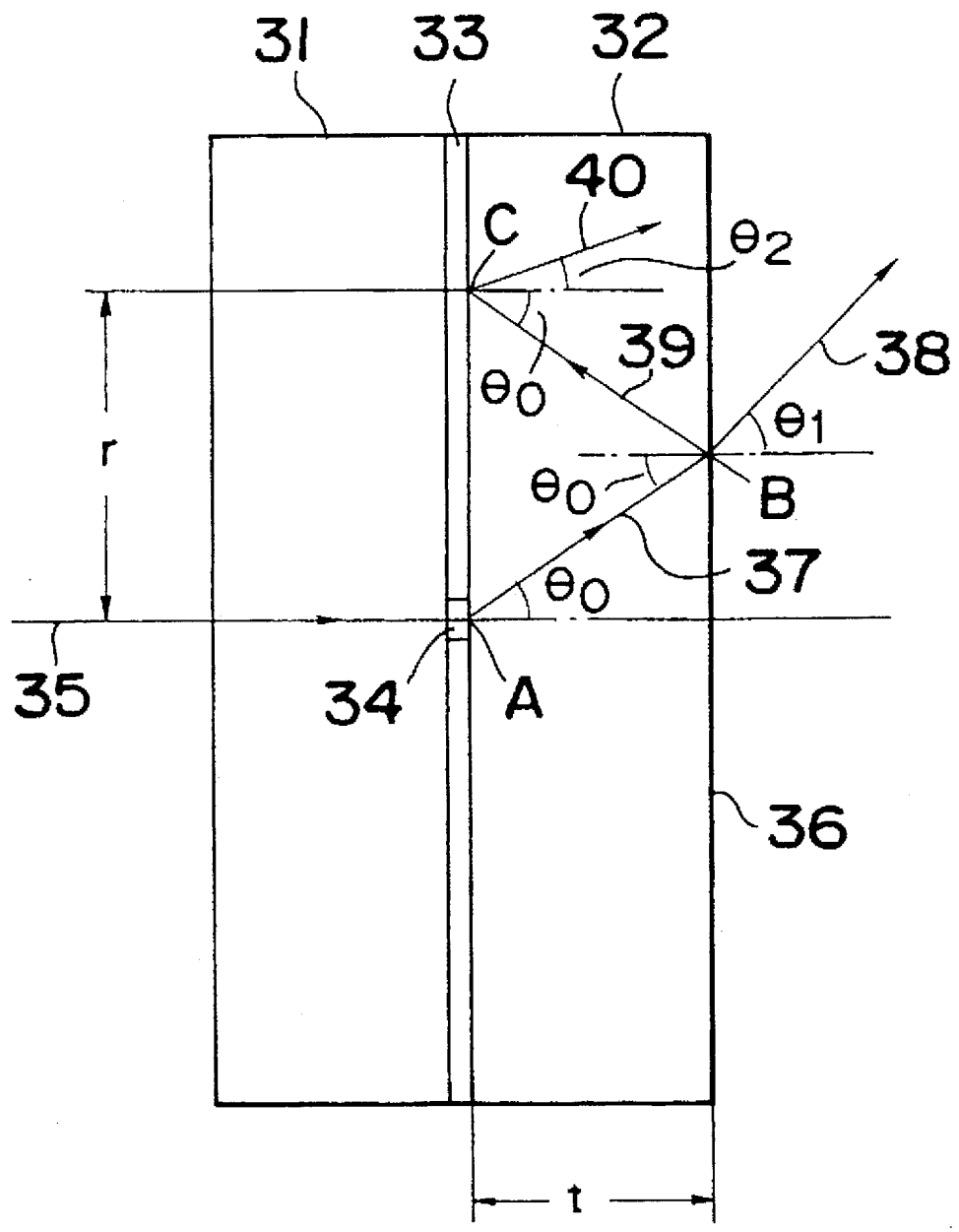
FIG. 1 is a schematic diagram of a model of a light valve apparatus of the present invention.

FIG. 1 shows a model of a polymer dispersion liquid crystal panel. In the liquid crystal panel, a polymer dispersion liquid crystal layer 33 is interposed between two transparent substrates 31 and 32 disposed at input and output sides of the liquid crystal panel, respectively. The thickness of the substrate 31 disposed at the input side of the liquid crystal panel is designed to be sufficiently large relative to the area of a display region. A case is considered here in which thin collimated rays 35 are irradiated from the input side to only a minute region 34, having a point A as its center, of the display area without applying a voltage to the liquid crystal layer 33.

Assuming that $E_o$ denotes the luminance of the collimated rays on an input face of the liquid crystal layer 33, $\theta_o$ denotes an output angle of the collimated rays, i.e. an angle formed between the collimated rays and a normal of the liquid crystal layer 33, the luminance $B_o(\theta_o)$ of the front scattered light, i.e. light scattered in the direction of the angle $\theta_o$, is expressed by the following equation (1).

$$B_o(\theta_o) = \frac{1}{\pi} G_f(\theta_o) E_o \quad (1)$$

In the equation (1), the quantity $G_f(\theta_o)$ is referred to as "front scattering gain in the direction of the angle $\theta_o$".

When the minute region 34 has an area S, the intensity $I_o(\theta_o)$ of a light emitting portion in the direction of the angle $\theta_o$ is given as follows.

$$I_o(\theta_o) = B_o(\theta_o) S \cos \theta_o \quad (2)$$

At a point B on an output face 36 of the substrate 32 disposed at the output side of the liquid crystal panel, a light ray 37 outputted from the point A in the direction of the angle $\theta_o$ is divided into a transmitted light ray 38 and a reflected light ray 39. When the substrate 32 has a refractive index n and the transmitted light ray 38 has an output angle $\theta_1$, the following relation is obtained from Snell's law.

$$\sin \theta_1 = n \sin \theta_o \quad (3)$$

Supposing that the front scattered light from the is natural light and $\theta_{oT}$ denotes a critical angle of total reflection, the reflectance $R(\theta_o)$ of the front scattered light on the output face 36 is expressed as follows.

$$R(\theta_o) = \begin{cases} \frac{1}{2} \left\{ \frac{\sin^2(\theta_o - \theta_1)}{\sin^2(\theta_o + \theta_1)} + \frac{\tan^2(\theta_o - \theta_1)}{\tan^2(\theta_o + \theta_1)} \right\} & (0 \le \theta_o \le \theta_{oT}) \\ 1 & (\theta_{oT} \le \theta_o \le \pi/2) \end{cases} \quad (4)$$

The critical angle $\theta_{oT}$ of total reflection is given by the following equation.

$$\theta_{oT} = \sin^{-1} \frac{1}{n} \quad (5)$$

Light subjected to total reflection returns wholly to the liquid crystal layer 33.

The light ray 39 reflected at the point B on the output face 36 is incident upon the liquid layer 33 at a point C. Supposing that $E(\theta_o)$ represents normal illuminance at the point C and t denotes a thickness of the substrate 32 disposed at the output side of the liquid crystal panel, an incident angle of the reflected light ray 39 at the point C is $\theta_o$ and the length of an optical path from point A to the point C is $2t/\cos\theta_o$. Thus, the illuminance $E(\theta_o)$ obtained at the point C by the reflected light ray 39 is given as follows.

$$E9(\theta_o) = \frac{IR(\theta_o)\cos \theta_o}{(2t/\cos \theta_o)^2} \quad (6)$$

When the reflected light ray 39 is incident upon the liquid crystal layer 33, a scattered light ray 40 is forwardly outputted again by rear scattering from the liquid crystal layer 33 at an angle $\theta_2$. This corresponds to the formation of a secondary light source in the liquid crystal layer 33. Luminance $B(\theta_2)$ of the scattered light ray 40 from point C in the direction of the angle $\theta_2$ is expressed as follows.

$$B(\theta_2) = G_r(\theta_2, \theta_o) \frac{E}{\pi} \quad (7)$$

In the above equation (7), the quantity $G_r(\theta_2, \theta_o)$ is referred to as "rear scattering gain of the light ray incident in the direction of the angle $\theta_o$ and outputted in the direction of the angle $\theta_2$".

By combining the equations (1), (2), (6) and (7), the following relation is obtained.

$$B(\theta_2) = \frac{G_f(\theta_o) G_r(\theta_2, \theta_o) R(\theta_o) E_o S \cos^4 \theta_o}{4 \pi^2 t^2} \quad (8)$$

A distance r from the point A to the point C is expressed as follows.

$$r = 2t \tan \theta_o \quad (9)$$

From the equations (8) and (9), it is possible to obtain a distribution of the luminance of the scattered light ray 40.

Equation (8) can by simplified to consider the ramifications of the equation. In order to obtain maximum contrast of an image displayed by the polymer dispersion liquid crystal panel, diffusion while no voltage applied to the panel should approximate perfect diffusion. Assuming that the light ray is subjected to perfect diffusion forwardly and rearwardly from the the liquid crystal layer 33, $G_f(\theta_o) = \frac{1}{2}$ and $G_r(\theta_2, \theta_o) = \frac{1}{2}$ and thus, equation (8) is changed as follows.

$$B(\theta_2) = \frac{R(\theta_o) E_o S \cos^4 \theta_o}{16 \pi^2 t^2} \quad (10)$$

Figure 2:
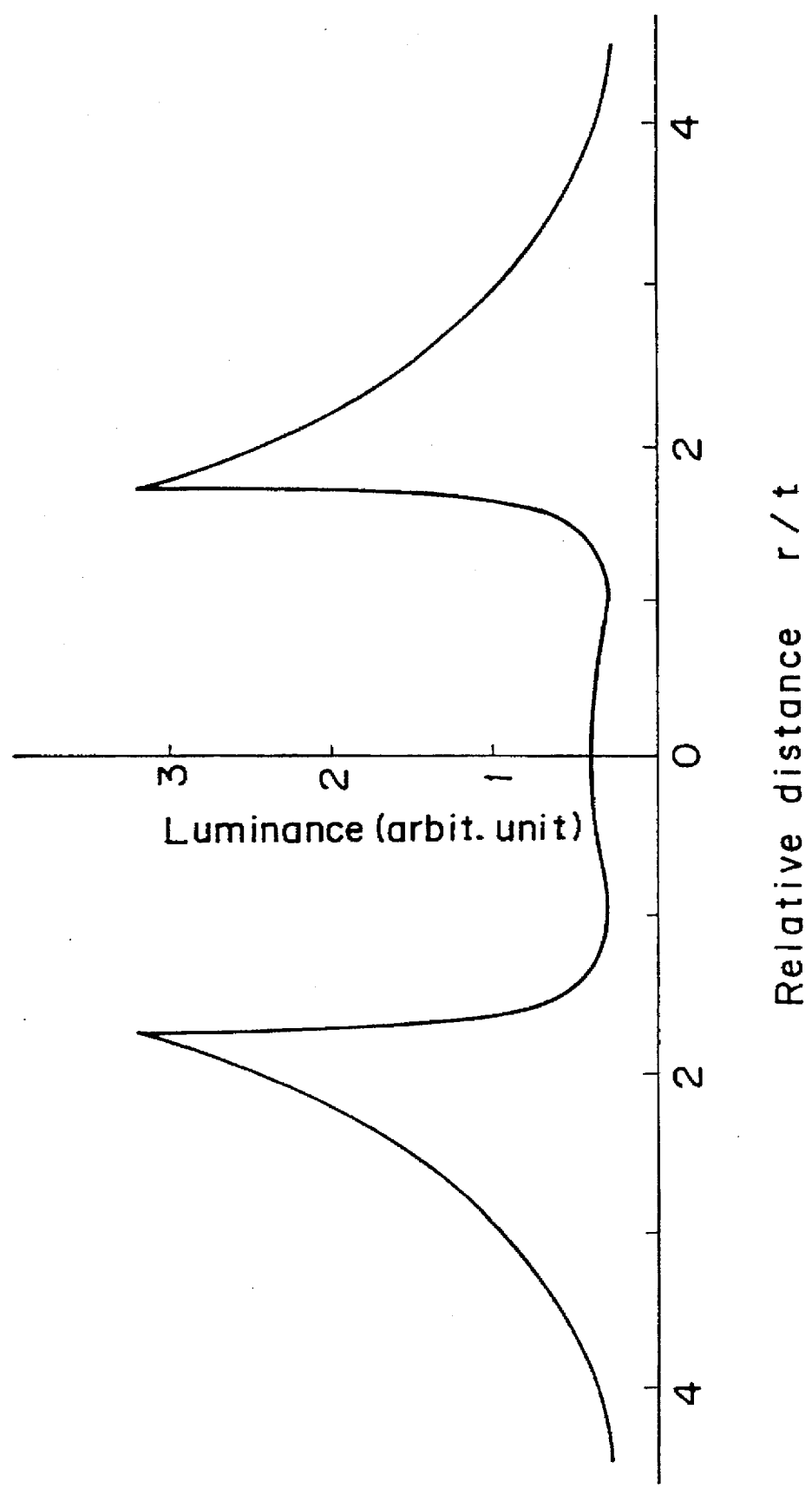
FIG. 2 is a graph showing a characteristic curve of the model of the light valve apparatus of FIG. 1.

Since it is apparent from the equation (10) that the luminance $B(\theta_2)$ is a function of $\theta_o$, the distribution of luminance of the scattered light ray 40 from the liquid crystal layer 33 becomes symmetric with respect to thin input collimated rays. A relation between the luminance $B(\theta_2)$ and the distance r, obtained from the equations (9) and (10), is shown in FIG. 2. It is seen from FIG. 2 that the luminance of the scattered light ray 40 assumes a maximum value at a location spaced a predetermined distance from the output point A. The angle $\theta_o$ leading to the maximum value of the distribution of luminance is approximately equal to the angle $\theta_{oT}$. Therefore, the distribution of luminance of the scattered light ray 40 has the form of a ring having a radius $r_R$ given as follows.

$$r_R = 2t \tan \theta_{oT} \quad (11)$$

By using equation (5), equation (11) is changed as follows.

$$r_R = \frac{2t}{\sqrt{n^2 - 1}} \quad (12)$$

The actual luminance of a pixel is equal to a sum of the luminance of front scattered light and the luminance of light outputted again by the influence of scattered light emitted from the remaining pixels. When the pixel is used for forming a white display, the luminance of the front scattered light is far larger than luminance of the light outputted again, so that actual luminance of the pixel may be regarded as being substantially identical with the luminance of the front scattered light. However, when the pixel is used for forming a black display, the actual luminance of the pixel becomes high through the addition of luminance of the light outputted again, even if luminance of the front scattered light is quite low. It should be noted that the actual luminance of the pixel is likely to be most influenced by the scattered light emitted from pixels spaced the radius $r_R$ (equation (12)) from the pixel.

From the above, it will be understood that a poor contrast of a projected image of a projection display system employing a polymer dispersion liquid crystal panel is partly due to the fact that gain at the time when no voltage is applied to the liquid crystal panel is not low and also partly due to the above-mentioned phenomena.

Hereinbelow, function of the present invention is described. It is seen from the equation (10) that as the thickness t of the substrate 32 disposed at the output side of the liquid crystal panel becomes larger, the luminance $B(\theta_2)$ of the scattered light ray 40 becomes smaller. Therefore, if the thickness t of the substrate 32 disposed at the output side of the liquid crystal panel is increased, the contrast of the displayed image is improved. This is the first aspect of the present invention for improving contrast.

Figure 3:
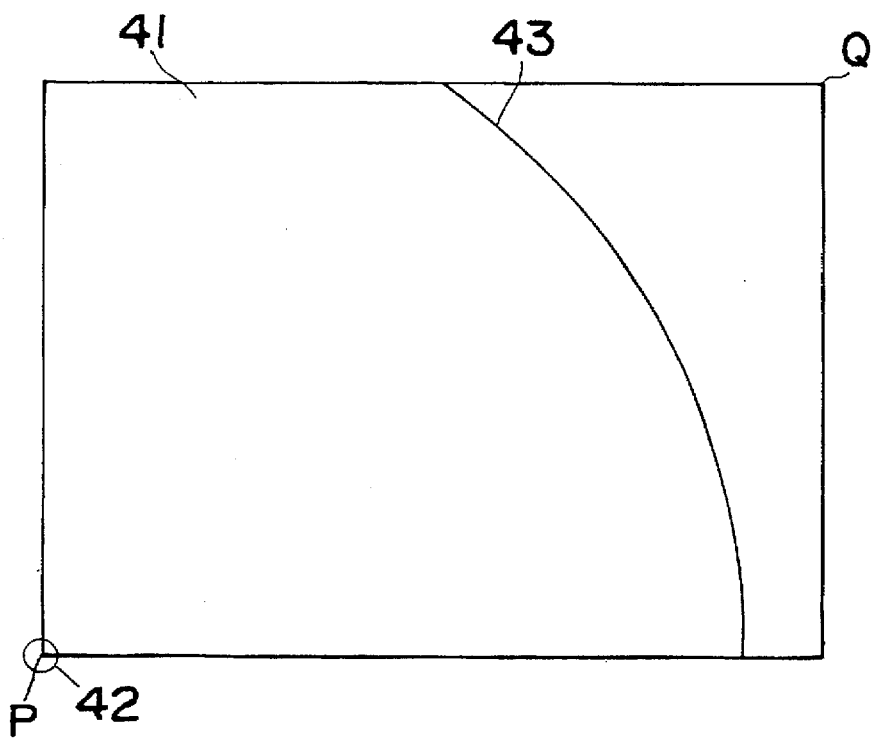
FIG. 3 is a schematic diagram of the luminance distribution of the model of the light valve apparatus of FIG. 1.

As shown in FIG. 3, a case is considered in which points P and Q give a maximum diameter of an effective display region 41 of the liquid crystal layer 33 and collimated rays are irradiated to only a minute region 42 having the point P as its center. A light ray outputted from the point P and reflected by the output face 36 is again outputted from the liquid crystal layer 33 so as to form a ring 43 on the liquid crystal layer 33. At this time, in order to restrict the luminance of the light ray outputted again from the liquid crystal layer 33, the point Q should be disposed inside the ring 43. Namely, supposing that d denotes a length from the point P to the point Q, the following relation should be satisfied.

$$r_R \geq d \quad (13)$$

When the radius r is eliminated from the equations (12) and (13), the following relation is obtained.

$$t \geq \frac{d}{2} \sqrt{n^2 - 1} \quad (14)$$

When the condition of equation (14) is satisfied, rise luminance in the effective display region 41 due to unnecessary light is avoided, thereby resulting in improved contrast. Increasing the diameter of the ring 43 is the second aspect of the present invention for improving contrast. Meanwhile, through various experiments, the present inventors have found that contrast can be effectively improved sufficiently if a maximum diameter of the effective display region 41 is smaller than the diameter of the ring 43, namely the following relation is satisfied.

$$2r_R \geq d \quad (15)$$

When the radius r is eliminated from the equations (12) and (15), the following relation is obtained.

$$t \geq \frac{d}{4} \sqrt{n^2 - 1} \quad (16)$$

The thickness t of the substrate 32 disposed at the output side of the liquid crystal panel may be selected so as to satisfy equation (16).

Figure 4:
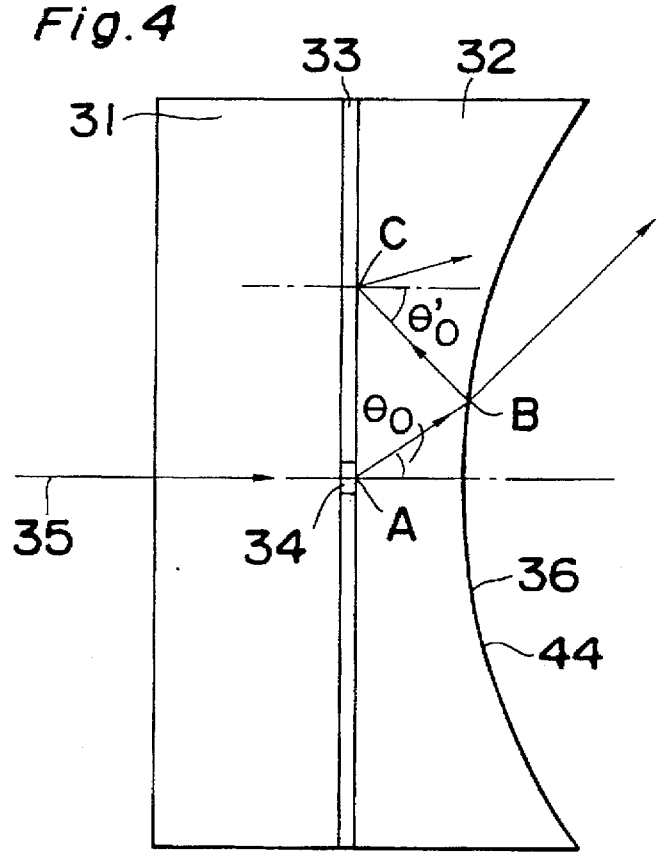
FIG. 4 is a schematic diagram of another model of the light valve apparatus of the present invention.

Next, a case in which the 36 of the output face 36 of the substrate 32 is concave will be described with reference to FIG. 4. The material and central thickness of the substrate 32 of FIG. 4 are identical with those of the substrate 32 of FIG. 1 and thus, the substrate 32 of FIG. 4 is different from that of FIG. 1 in that the substrate 32 of FIG. 4 has the concave output face 36. As shown in FIG. 4, without applying a voltage applied to the liquid crystal layer 33, the thin collimated rays 35 are irradiated from the input side to only the minute region 34 having the point A as its center in the display area. When a light ray is outputted from the point A on the liquid crystal layer 33 and reflected at the point B on a concave surface 44 so as to be incident upon the point C on the liquid crystal layer 33, a distance between a virtual image of the minute region 34 seen at the point C and the point C becomes longer as compared with that of FIG. 1 because the output face 36 of FIG. 4 has the concave surface 44, while the output face 36 of FIG. 1 has a flat surface. Meanwhile, in FIG. 4, since the incident angle of the light ray incident upon the point C after having been reflected at the point B becomes larger as compared with that of FIG. 1, the luminance of the light ray outputted again from the liquid crystal layer 33 at the point C drops in view of the equation (10).

Meanwhile, since the distance from the point A to the point C is increased, the diameter of the ring increases. Thus, by employing the concave surface 44 of FIG. 4 instead of a flat surface, the luminance of the light ray outputted again from the liquid crystal layer 33 can be reduced and thus, the contrast of the displayed image can be improved. In comparison with the substrate 32 having the flat surface as shown in FIG. 1, the substrate 32 having the concave surface 44 as shown in FIG. 4 shows greater effects for improving contrast even if the central thickness of the substrate 32 of FIG. 4 is smaller than that of FIG. 1.

Figure 5A:
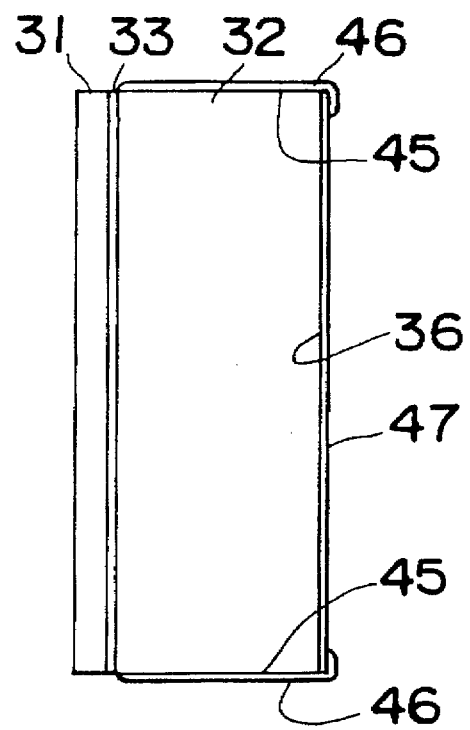
FIGS. 5(a) and 5(b) are schematic diagrams of other models of the light valve apparatus of the present invention.
Figure 5B:
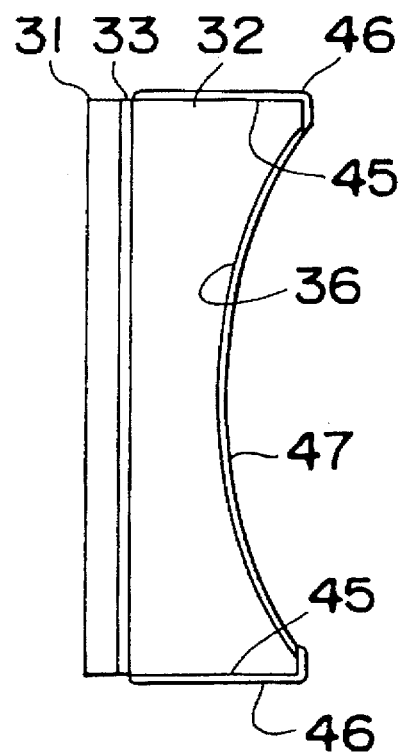

Subsequently, when a light ray is reflected on an ineffective face of the substrate 32, the light ray returns to the liquid crystal layer 33, thereby increasing the luminance of a black display portion. As shown in FIGS. 5(a) and 5(b), this problem can be solved by a technique in which a light absorbing means 46 is provided on the ineffective face of the substrate 32 so as to absorb unnecessary light. Furthermore, if an anti-reflection coating 47 is provided on an effective area of the output face 36 of the substrate 32, reflectance of the light ray on the output face 36 after having been outputted from the liquid crystal layer 33 at the small angle is reduced and thus, luminance of the black display portion can be suppressed.

Thus, it is possible to provide a light valve apparatus for displaying a bright image having high contrast. Meanwhile, if this light valve apparatus is used for a projection display system, a viewfinder system or a display system, a bright image having excellent contrast can be obtained.

Figure 7:
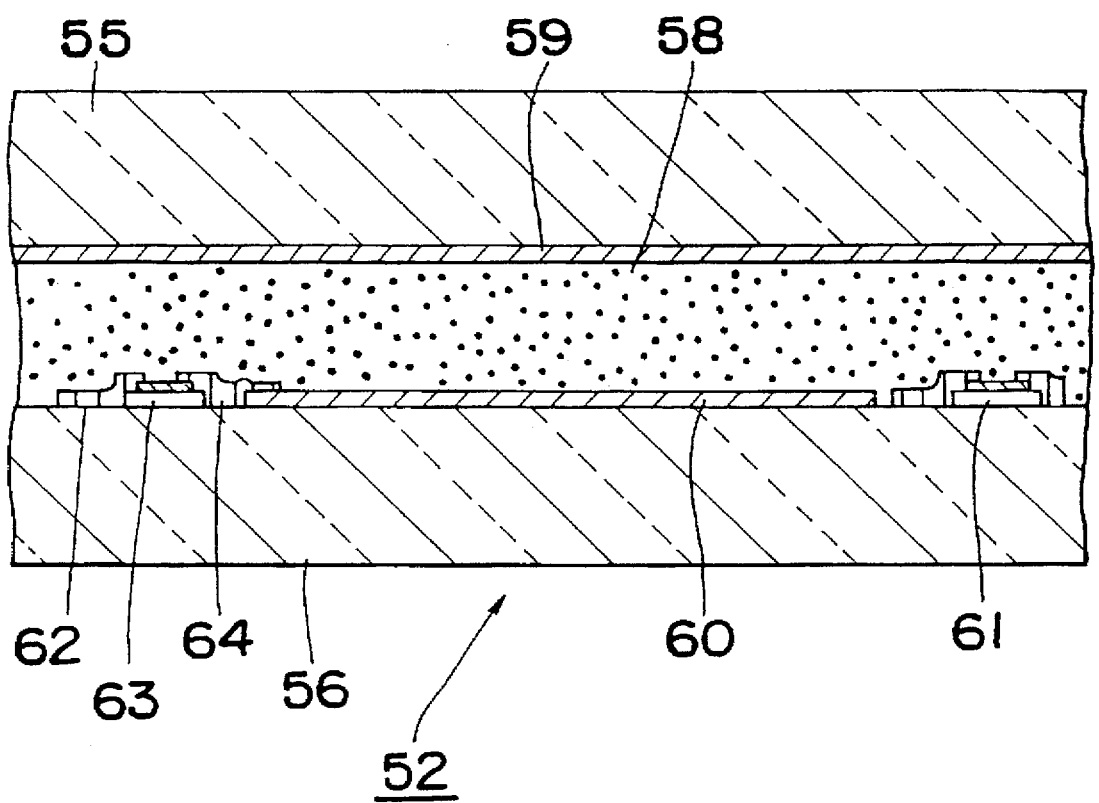
FIG. 7 is an enlarged fragmentary sectional view of a liquid crystal panel employed in the projection display system of FIG. 6.

FIG. 6 shows a first embodiment of a projection display according to the present invention. In FIG. 6, a light valve apparatus 51 includes a liquid crystal panel 52, a transparent plate 53 and a transparent body 54. Two glass substrates 55 and 56 and sealing compound 57 constitute a sealed vessel. Polymer dispersion liquid crystal, serving as a liquid crystal layer 58 of the panel, fills the sealed vessel. The liquid crystal layer 58 is interposed between the glass substrates 55 and 56 disposed at input and output sides of the liquid crystal panel 52, respectively. As shown in FIG. 7, a common electrode 59 formed by a transparent and electrically conductive film is provided on one of opposite faces of the substrate 55 adjacent to the liquid crystal layer 58. Meanwhile, a number of pixel electrodes 60 are provided in a a matrix on one of opposite faces of the substrate 56 adjacent to the liquid crystal layer 58. A thin film transistor (TFT) 61 acting as a switching element is provided in the vicinity of each of the pixel electrodes 60. In the TFT 61, a source electrode 62 is connected to a signal line, a gate electrode 63 is connected to a scanning line and a drain electrode 64 is connected to each of the pixel electrodes 60. The signal line is connected to a signal supply line, while the scanning line is connected to a scanning circuit. A signal voltage is supplied to each pixel by the signal supply circuit and the scanning circuit. When subjected to a sufficient electric field, the liquid crystal layer 58 causes incident light to proceed straight-forwardly therethrough. On the contrary, when subjected to no electric field, the liquid crystal layer 58 scatters incident light. As a result, the liquid crystal layer 58 at each pixel controls the scattering of light based on the presence or lack of an applied voltage. Thus, an optical image can be formed, based on the state of the layer 58, on the liquid crystal panel 52 in accordance with an image signal.

The transparent plate 53 is coupled, through the transparent body 54, with the output side of the liquid crystal panel 52. A spacer 65 is provided between the periphery of the substrate 56 and the transparent plate 53 so as to dictate the thickness of the transparent body 54. Black paint 67 is coated on a side face 66 of the transparent plate 53, while an anti-reflection coating 69 is provided in an effective region of an output face 68 of the transparent plate 53. The glass substrate 56 is formed by a glass sheet having a thickness of 1 mm, while the transparent plate 53 is formed by a glass plate having a thickness of 10 mm. The glass substrate 56 and the transparent plate 53 each have a refractive index of 1.52. The transparent body 54 is formed by transparent silicone resin "KE1051" (brand name of Shin-Etsu Chemical Co., Ltd. of Japan) and has a thickness of 2 mm and a refractive index of 1.40. This resin is formed by two kinds of liquids. When the two kinds of the liquids are mixed with each other and are either allowed to stand at room temperature or heated, the liquids gel through addition polymerization. Alternatively, the transparent plate 53 may be made of transparent resin such as acrylic resin. Since transparency is the only prerequisite for the transparent body 54, the transparent body 54 may be made of liquid such as ethylene glycol, epoxy type transparent adhesive, transparent silicone resin which gels when irradiated with ultraviolet rays, etc. In the case of each of the above-mentioned alternative materials of the transparent body 54, an air gap should not be formed between the substrate 56 and the transparent plate 53 because abnormal image quality is produced if an air gap exists between the substrate 56 and the transparent plate 53.

A light source 70 is constituted by a lamp 71 and a concave mirror 72. Light emitted from the lamp 71 is concentrated by the concave mirror 72 such that light having a relatively high degree of directivity is outputted from the light source 70. The output light from the light source 70 is sequentially transmitted through a field lens 73, the liquid crystal panel 52, the transparent body 54 and the transparent plate 53 so as to be incident upon a projection lens 74. A pupil of the projection lens 74 is sized such that when a pixel disposed at a center of an image plane of the liquid crystal panel 52 is in a transparent state, about 90% of the light outputted from the pixel diffusely is incident upon the pupil. The field lens 73 is provided for the following purpose. Namely, light transmitted toward a periphery of the display region of the liquid crystal panel 52 is refracted inwardly by the field lens 73 so as to be incident upon the pupil of the projection lens 74 such that a peripheral portion of a projected image is not made dark. The projection lens 74 is used in combination with the transparent body 53 such that an excellent image forming property is obtained. Focusing adjustments of the projected image are made by displacing the projection lens 74 along an optical axis 75.

The optical image is formed on the liquid crystal panel 52 in accordance with the image signal. Among light rays outputted from the pixels, the projection lens 74 receives a portion of the light rays, which is contained in a certain solid angle. If the state of the panel changes, which determines whether light rays outputted from the pixels scatter, the quantity of the light rays contained in the solid angle also changes. Thus, the optical image formed on the liquid crystal panel 52 is converted into changes of illuminance on a screen 76. Thus, the optical image formed on the liquid crystal panel 52 is projected onto the screen on an enlarged scale by the projection lens 74.

In the arrangement of FIG. 6, the thickness of the optics from the liquid crystal layer 58 to the boundary surface 68 of the transparent plate 53 in contact with air is large. Hence, when front scattered light outputted from the liquid crystal layer 58 is reflected by the output face 68 of the transparent plate 53 so as to return to the liquid crystal layer 58 and then, is again outputted from the liquid crystal layer 58 through rear scattering at the time no voltage is applied to the liquid crystal layer 58, the luminance of the light outputted again from the liquid crystal layer 58 becomes smaller in comparison with a case in which the transparent plate 53 is not provided. Meanwhile, since light incident upon the side face 66 of the transparent plate 53 is absorbed by the black paint 67 coated on the side face 66, the amount of unnecessary light which would otherwise return to the liquid crystal layer 58 is reduced and thus, the contrast of the image displayed on the liquid crystal layer 58 is improved. Furthermore, since the anti-reflection coating 69 is provided on the output face 68 of the transparent plate 53, the reflection on the output face 68 of light which has been outputted from the liquid crystal layer 58 at a small output angle is suppressed, which also contributes to improving the contrast of the image displayed on the liquid crystal layer 58.

Figure 8:
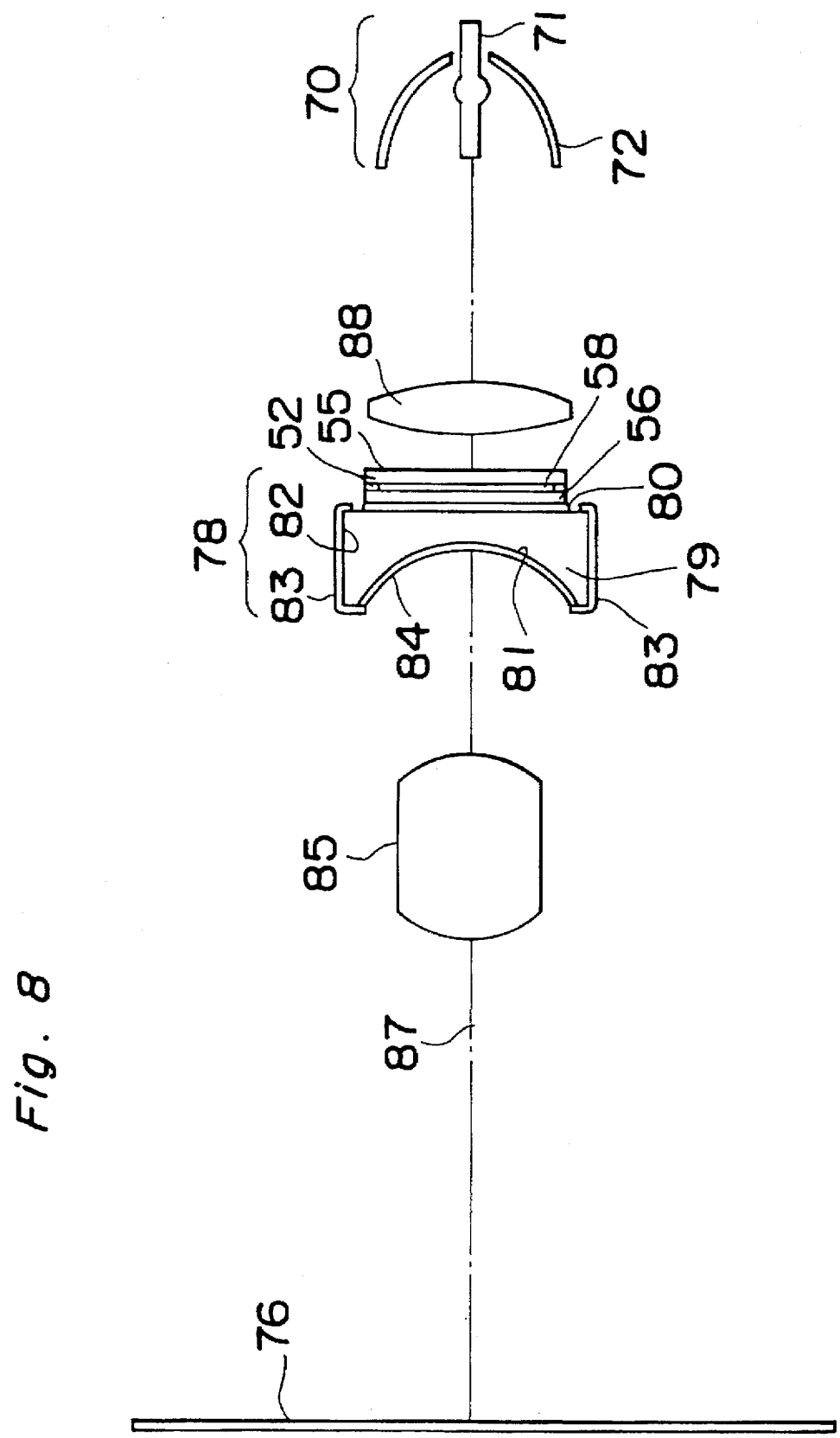
FIG. 8 is a schematic diagram of a second embodiment of a projection display system according to the present invention.

FIG. 8 shows a a second embodiment of projection display system according to the present invention. In FIG. 8, the liquid crystal panel 52 and the light source 70 are the same as those of FIG. 7. A light valve 78 includes the liquid crystal panel 52, a plano-concave lens 79 and a transparent adhesive layer 80. An output face of the glass substrate 56 is bonded to the plano-concave lens 79 by the transparent adhesive layer 80 such that a concave surface 81 of the plano-concave lens 79 is oriented towards an output side. Black paint 83 is coated on a side face 82 of the plano-concave lens 79, while an anti-reflection coating 84 is deposited on the concave surface 81 of the plano-concave lens 79. The plano-concave lens 79 is made of acrylic resin by molding. Since molding dies enable the production of identical lenses, molding is suitable for mass production.

A projection lens 85 is used in combination with the plano-concave lens 79 such that an optical image on the liquid crystal layer 58 is formed on the screen 76. Since light outputted from the concave surface 81 is required to be incident upon the projection lens 85, light incident upon the liquid crystal panel 52 should be converged light. Focusing adjustments of the projected image are made by displacing the projection lens 85 along an optical axis 87.

Light from the light source 70 is transmitted through a field lens 88 so as to be incident upon the liquid crystal panel 52. Since the output face of the light valve 78 has the concave surface 81, luminance due to light outputted again from the liquid crystal layer 58 can be restricted as described above. Therefore, the contrast of the displayed image on the liquid crystal layer 58 is excellent and thus, the contrast of the projected image is also improved. Meanwhile, the black paint 83 coated on the side face 82 of the plano-concave lens 79 and the anti-reflection coating 84 deposited on the concave surface 81 of the plano-concave lens 79 perform functions identical with those of the first embodiment so as to improve the contrast of the projected image.

Figure 9:
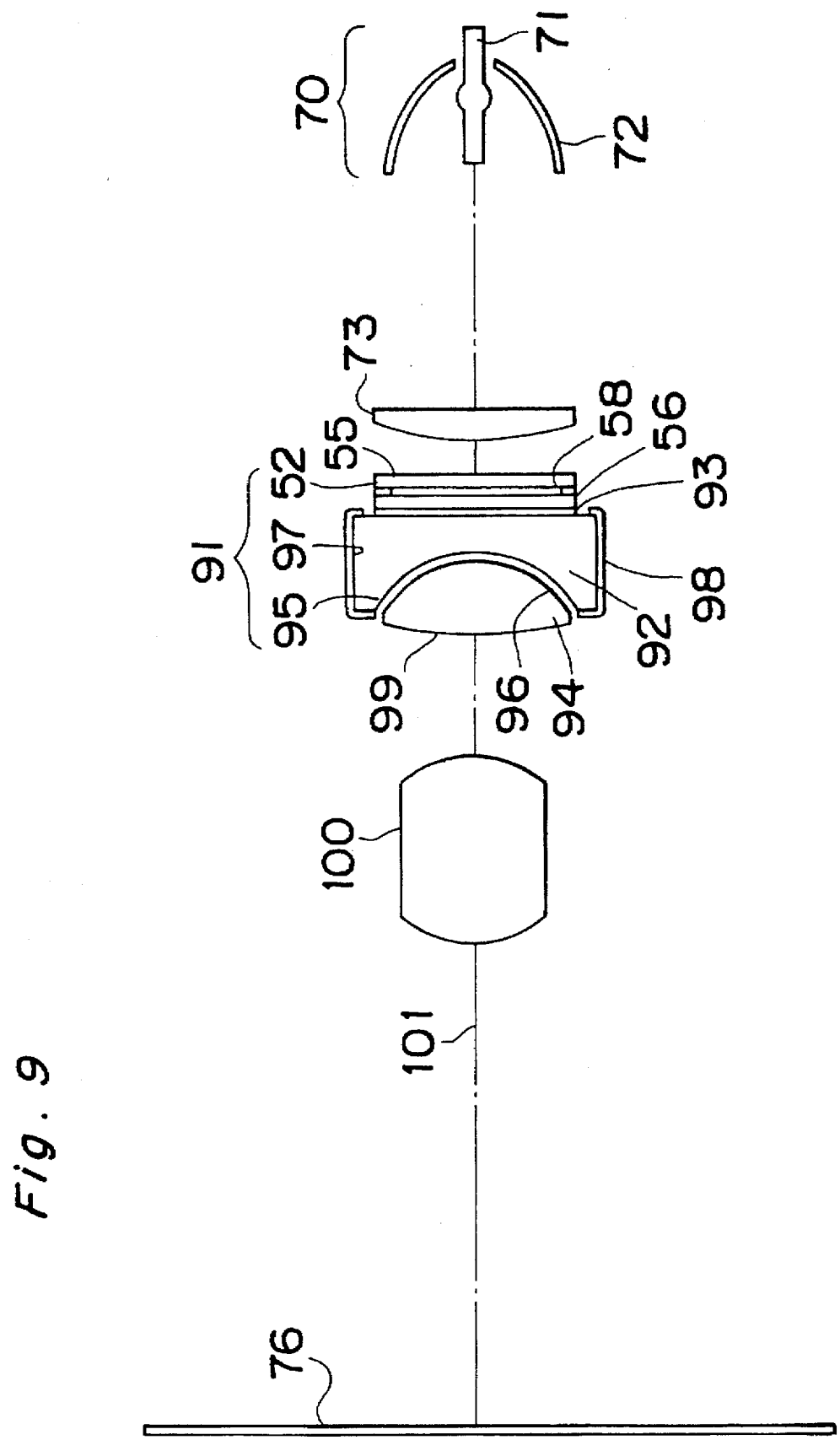
FIG. 9 is a schematic diagram of a third embodiment of a projection display system according to the present invention.

FIG. 9 shows a third embodiment of a projection display system according to the present invention. In FIG. 9, the liquid crystal panel 52 and the light source 70 are the same as those of FIG. 6. A light valve 91 includes the liquid crystal panel 52, a plano-concave lens 92, a transparent adhesive layer 93 and a positive lens 94. The plano-concave lens 92 is bonded to an output face of the glass substrate 56 by the transparent adhesive layer 93 such that a concave surface 95 of the plano-concave lens 92 is oriented towards an output side. At an output side of the plano-concave lens 92, the positive lens 94 is provided in close vicinity to the plano-concave lens 92. A radius of curvature of a convex surface 96 of the positive lens 94 is identical with that of the concave surface 95 of the plano-concave lens 92. A small air gap is provided between the concave surface 95 and the convex surface 96. Black paint 98 is coated on a side face of the plano-concave lens 92, while an anti-reflection coating (not shown) is deposited on the concave surface 95 of the plano-concave lens 92. Although not specifically shown, anti-reflection coatings are deposited also on opposite surfaces 96 and 99 of a positive lens 94. A projection lens 100 is used in combination with the plano-concave lens 92 and the positive lens 94 such that an optical image on the liquid crystal layer 58 is formed on the screen 76. Focusing adjustments of the projected image are made by displacing the projection lens 100 along an optical axis 101.

Also in the arrangement of FIG. 9, since the plano-concave lens 92 is bonded to the output face of the liquid crystal panel 52 and the black paint 98 is coated on the side face 97 of the plano-concave lens 92 in the same manner as in the arrangement of FIG. 8, the projected image has excellent contrast. The polymer dispersion liquid crystal panel is not so dependent upon the incident angle for its optical characteristics as a TN liquid crystal panel. However, in the polymer dispersion liquid crystal panel, when the incident angle of light is extremely large, scattering characteristics change due to an increase in the length of the optical path at the time the light passes through the liquid crystal panel 58. Namely, if the incident angle of a light ray incident upon the liquid crystal panel 52 varies according to its location, the image quality of the projected image becomes nonuniform. On the other hand, in the arrangement of FIG. 8, if the radius of curvature of the concave surface 81 is to be reduced, either converged light having a large convergence angle should be incident upon the liquid crystal panel 52 or the effective diameter of the projection lens 85 should be increased. However, in the former case, since the image quality would not be uniform at locations on the liquid crystal panel 52, the image quality of the projected image would become nonuniform. Meanwhile, in the latter case, such a problem arises that the projection lens 85 must be larger, thereby resulting in an increase in the production cost of the display system. In the case where the liquid crystal panel 52 is heavily dependent upon the incident angle for its scattering characteristics, the plano-concave lens 92 may be combined with the positive lens 94 as shown in FIG. 9, so that light approximate to collimated rays can be incident upon the liquid crystal panel 52 without the need for making the projection lens 100 larger and thus, a uniform image quality of the projected image can be readily secured.

One of opposite faces of the positive lens 94 adjacent to the liquid crystal panel 52 may have a radius of curvature identical with or smaller than that of the concave surface 95 of the plano-concave lens 92. Since the positive lens 94 is fitted into the concave surface 95, the distance from the liquid crystal layer 58 to one of opposite vertexes of the positive lens 94 adjacent to the projection lens 100 can be shortened.

Figure 10:
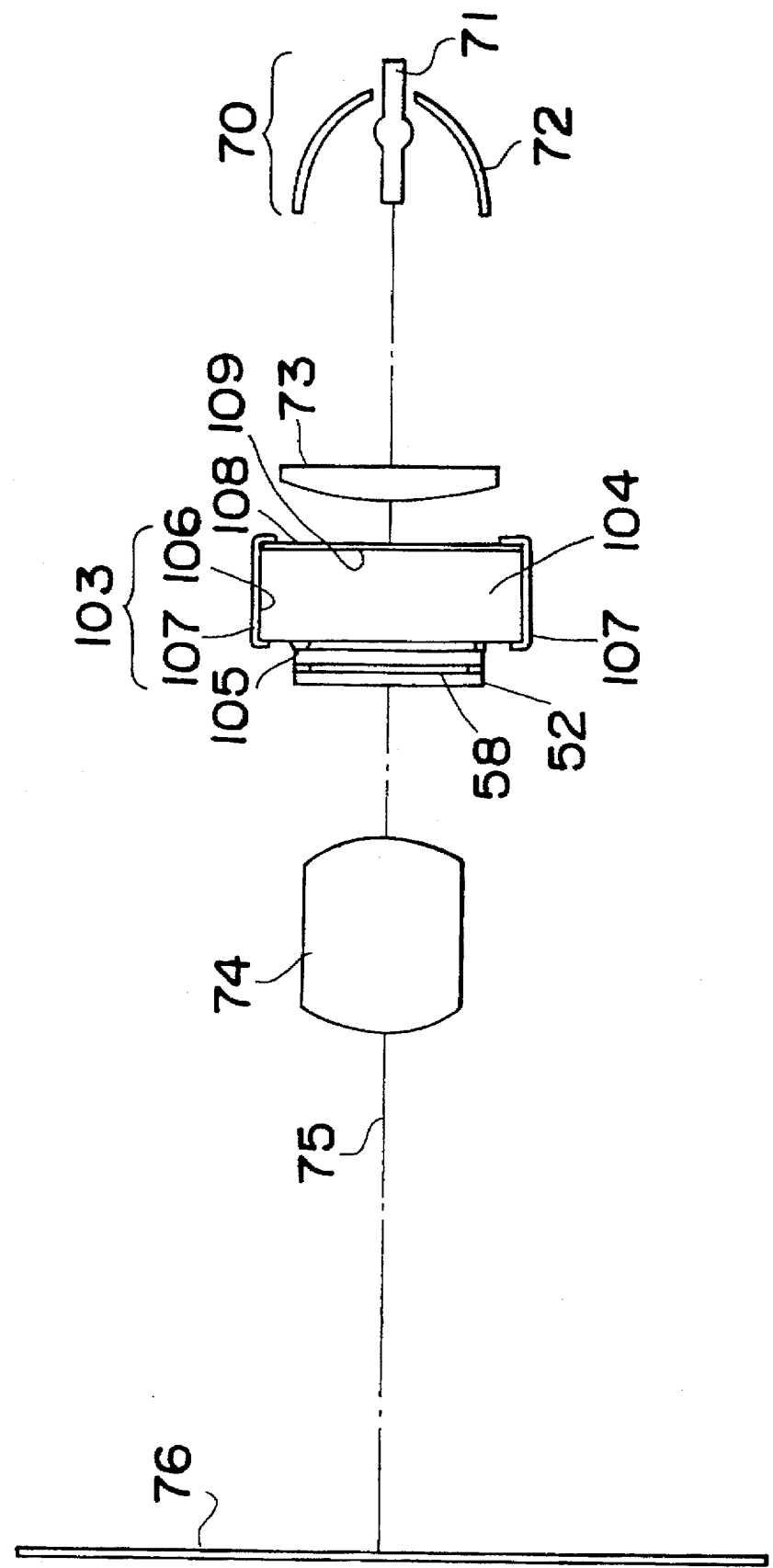
FIG. 10 is a schematic diagram of a fourth embodiment of a projection display system according to the present invention.

FIG. 10 shows a fourth embodiment of projection display system according to the present invention. In FIG. 10, elements other than a light valve apparatus 103 are the same as those of FIG. 6. The light valve apparatus includes the liquid crystal panel 52, a transparent plate 104 and a transparent body 105. The transparent plate 104 is coupled with an input side of the liquid crystal panel 52 through the transparent body 105. Black paint 107 is coated on a side face 106 of the transparent plate 104, while an anti-reflection coating 108 is deposited on an input face of the transparent plate 104.

When no voltage is applied to the polymer dispersion liquid crystal panel, rear scattering occurs in addition to front scattering. Thus, in the arrangement of FIG. 6, rear scattered light is reflected on the input face 102 of the glass substrate 55 disposed at the input side of the liquid crystal panel 52 so as to be again incident upon the liquid crystal layer 58. Since the light incident again upon the liquid crystal layer 58 increases the luminance of the black display region, the contrast of the projected image is lowered. However, in the arrangement of FIG. 10, even if rear scattered light is reflected on the input face 108 of the transparent plate 104 so as to be again incident upon the liquid crystal layer 58, the illuminance of the liquid crystal layer 58 by the light incident again upon the liquid crystal layer 58 becomes low due to an increase in the length of its optical path. Therefore, in the arrangement of FIG. 10, the projected image has excellent contrast in comparison with a case in which the transparent plate 104 is not provided.

When the first embodiment of FIG. 6 and the fourth embodiment of FIG. 10 are combined with each other, namely, the transparent plates are, respectively, provided at both the input side and the output side of the polymer dispersion liquid crystal panel 52, the contrast of the projected image is further improved. Thus, many modifications of the light valve apparatus of the present invention can be considered as shown in FIGS. 11(a) to 11(k). In FIGS. 11(a) to 11(k), the righthand portion corresponds to the input side. Further, the transparent plates 111 and the plano-concave lens 112 are connected to the liquid crystal panel 52 by transparent adhesive. Meanwhile, black paint is coated on ineffective faces of the transparent plate 111 and the plano-concave lens 112. When the plano-concave lens 112 is employed, a positive lens 114 may be combined with the plano-concave lens 112. Meanwhile, in order to brighten a peripheral portion of the projected image, it is desirable that a field lens be provided at the input side of the light valve. However, when the plano-concave lens 112 is provided at the input side of the liquid crystal panel 52 and the positive lens 114 is provided at the input side of and in close vicinity to the plano-concave lens 112, the positive lens 114 functions as a field lens. In any one of the arrangements of FIGS. 11(a) to 11(k), the projected image has excellent contrast as compared with the conventional arrangements in the same manner as the foregoing embodiments. Further, the section of the light valve from the liquid crystal layer to a surface in contact with air may be made of a single material or may also be made of a plurality of materials.

Figure 12:
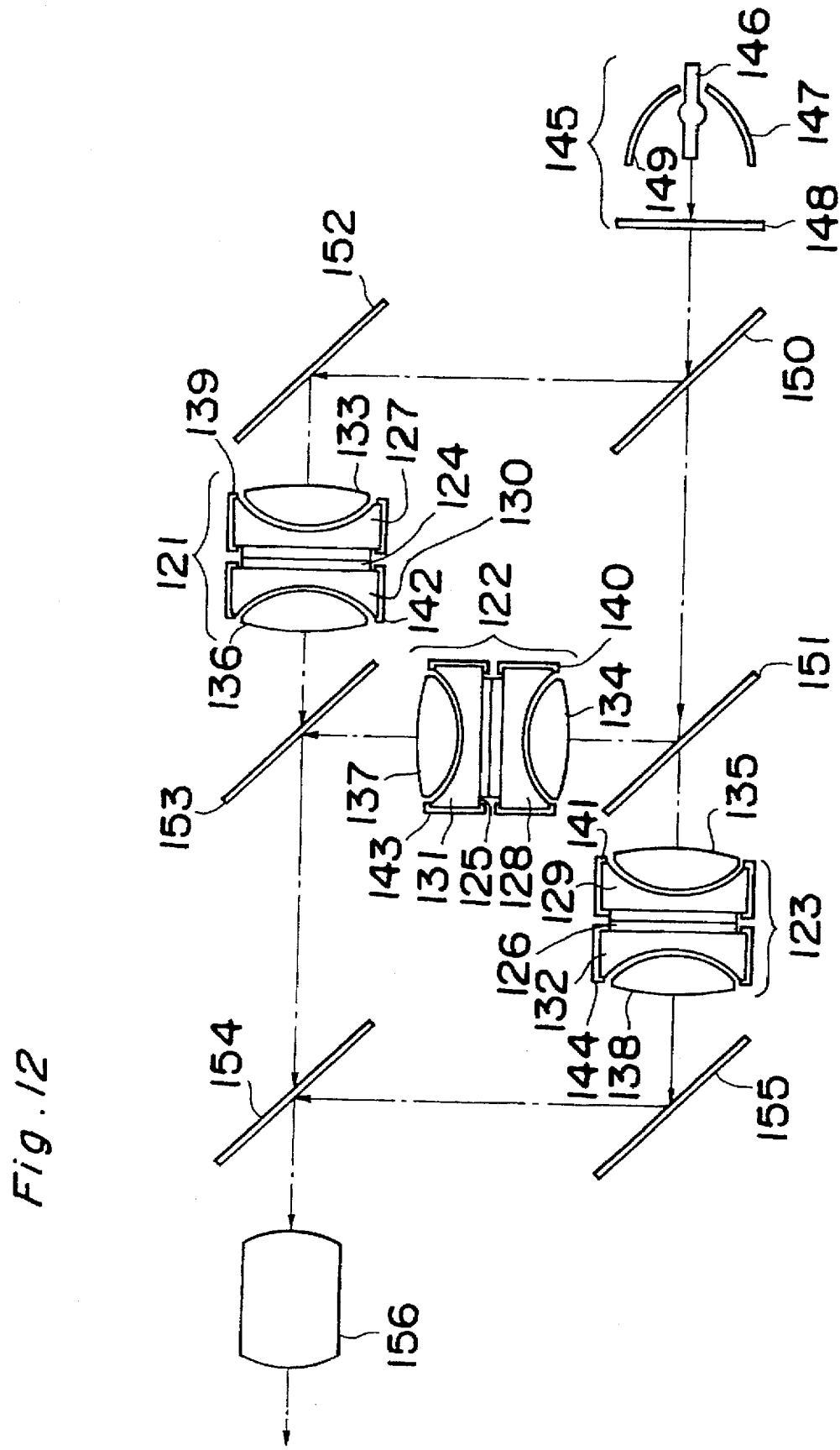
FIG. 12 is a schematic diagram of a fifth embodiment of a projection display system according to the present invention.

FIG. 12 shows a fifth embodiment of a projection display system according to the present invention. In FIG. 12, light valves 121, 122 and 123 have an identical arrangement. Namely, the light valve 121 includes a liquid crystal panel 124, plano-concave lenses 127 and 130 and positive lenses 133 and 136. Similarly, the light valve 122 includes a liquid crystal panel 125, plano-concave lenses 128 and 131 and positive lenses 134 and 137, while the light valve 123 includes a liquid crystal panel 126, plano-concave lenses 129 and 132 and positive lenses 135 and 138. Each of the liquid crystal panels 124 to 126 is formed by a polymer dispersion liquid crystal panel and is identical with that of FIG. 7. The plano-concave lenses 127, 128 and 129 are, respectively, coupled with the input sides of the liquid crystal panels 124, 125 and 126 by transparent adhesive, while the plano-concave lenses 130, 131 and 132 are, respectively, coupled with the output sides of the liquid crystal panels 124, 125 and 126 by transparent adhesive. The positive lenses 133, 134 and 135 are, respectively, disposed at the input sides of the plano-concave lenses 127, 128 and 129 through a narrow air gap. On the other hand, the positive lenses 136, 137 and 138 are, respectively disposed at the output sides of the plano-concave lenses 130, 131 and 132 through a narrow air gap. Black paints 139, 140, 141, 142, 143 and 144 are coated on side faces of the plano-concave lenses 127, 128, 129, 130, 131 and 132, respectively.

A light source 145 is constituted by a lamp 146, a concave mirror 147 and a filter 148. The lamp 146 is a metal halide lamp and emits light of the primary colors of red, green and blue. The concave mirror 146 is made of glass. A multilayer film for reflecting visible light but transmitting infrared rays is deposited on a reflecting surface 149 of the concave mirror 147. The filter 148 is formed by depositing on a glass substrate a multilayer film for transmitting visible light but reflecting infrared light and ultraviolet light. Visible light contained in light radiated from the lamp 146 is reflected on the reflecting surface 149 of the concave mirror 147 and the reflected light approximates collimated rays. The filter 148 eliminates infrared light and ultraviolet light from reflected light outputted from the concave mirror 147 such that the reflected light outputted from the concave mirror 147 is visible light.

Subsequently, the light from the light source 145 is incident upon a color separation optical system formed by a combination of dichroic mirrors 150 and 151 and a flat mirror 152 so as to be separated into three light rays each of a respective one of the primary colors. The light rays of the respective primary colors are, respectively, incident upon the light valves 121, 122 and 123 so as to be transmitted through the positive lenses 133, 134 and 135 functioning as field lenses, respectively. The light rays outputted from the light valves 121, 122 and 123 are combined into a single light ray by a color composition optical system formed by a combination of dichroic mirrors 153 and 154 and a flat mirror 155 so as to be incident upon a projection lens 156. Optical images corresponding to image signals are formed on the liquid crystal panels 124, 125 and 126, respectively, and are projected onto a screen on an enlarged scale.

Since the plano-concave lenses 127 and 130, the plano-concave lenses 128 and 131 and the plano-concave lenses 129 and 132 are, respectively, provided at the input and output sides of the liquid crystal panels 124, 125 and 126 in order to restrict stray light, a drop in contrast due to stray light is suppressed. Meanwhile, since the three liquid crystal panels 124, 125 and 126 are used for red, green and blue,, respectively, the projected image has excellent brightness and resolution.

Figure 11A:
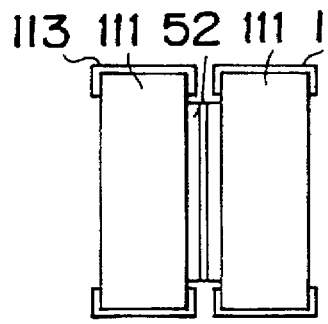
FIGS. 11(a) to 11(k) are schematic diagrams of various modifications of the light valve apparatus of the present invention, respectively.
Figure 11B:
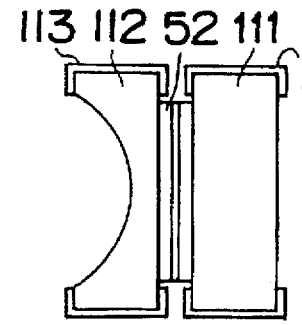
Figure 11C:
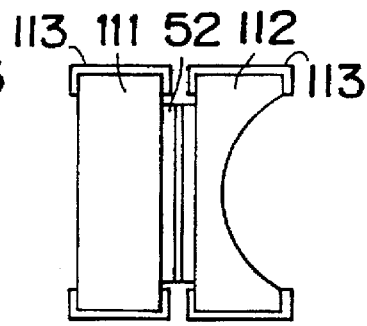
Figure 11D:
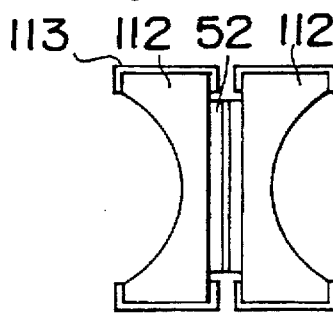
Figure 11E:
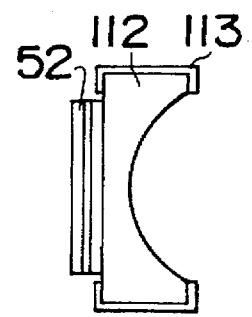
Figure 11F:
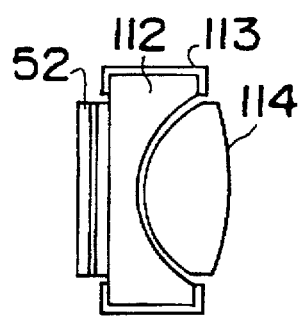
Figure 11G:
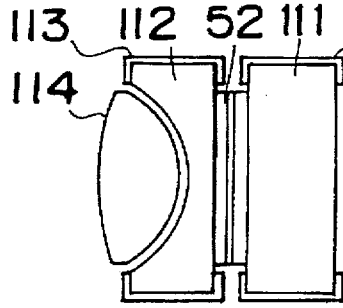
Figure 11H:
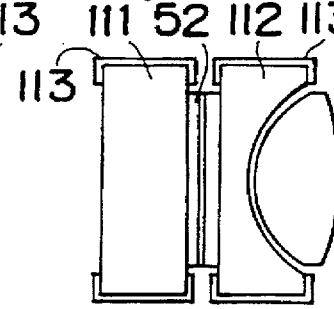
Figure 11I:
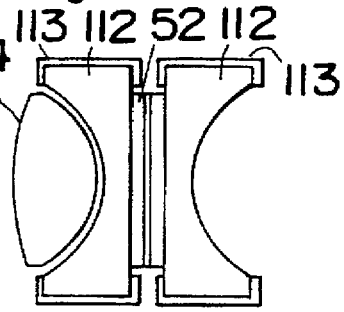
Figure 11J:
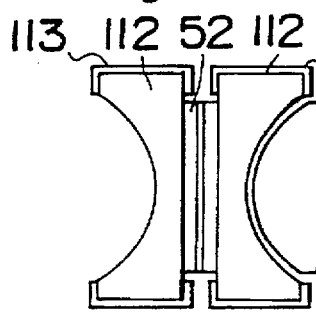
Figure 11K:
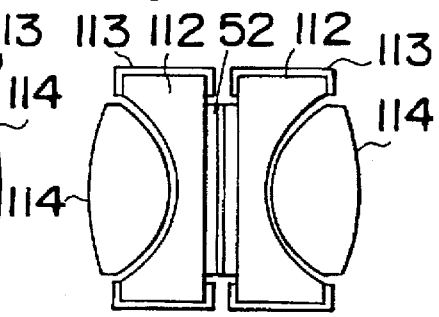

In the arrangement of FIG. 12, each of the light valves corresponds to that shown in FIG. 11(k) but may also be replaced by the light valves shown in FIGS. 6 to 10 and 11(a) to 11(j). The particular light valves should be selected in view of applications of and restrictive conditions imposed upon the projection display system.

Figure 13:
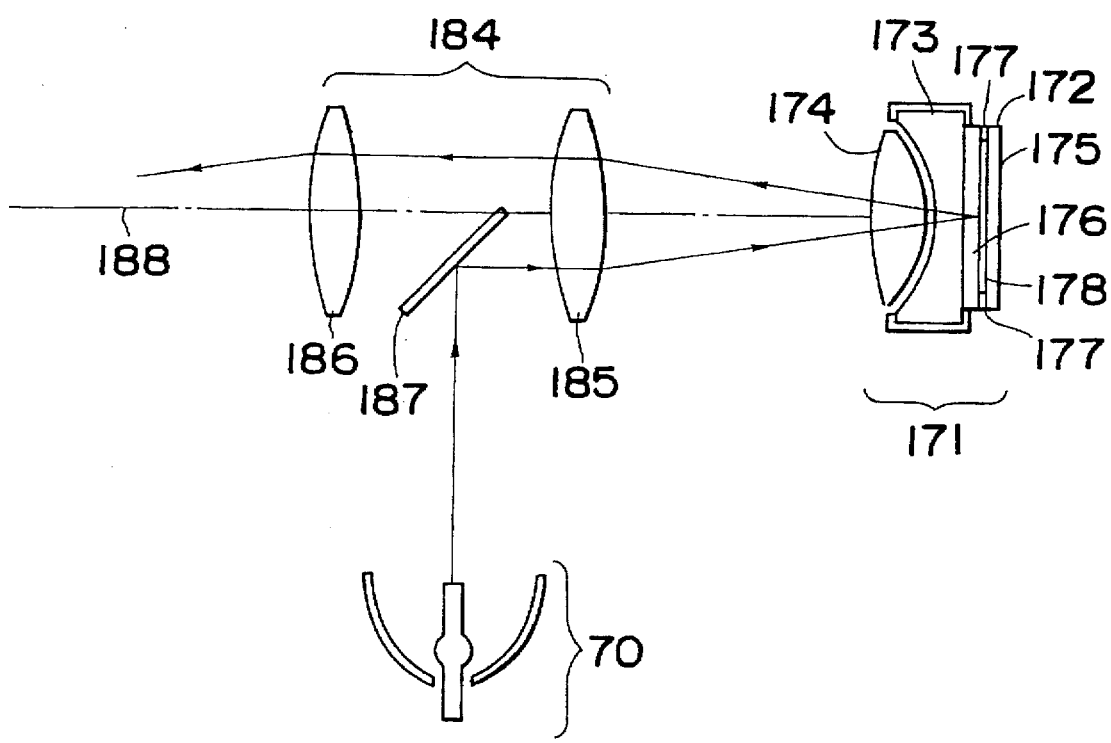
FIG. 13 is a schematic diagram of a sixth embodiment of a projection display system according to the present invention.

FIG. 13 shows a sixth embodiment of a projection display system according to the present invention. The display system includes the light source 70, a light valve 171 and a projection lens 184. The light source 70 is the same as that shown in FIG. 6.

Figure 14:
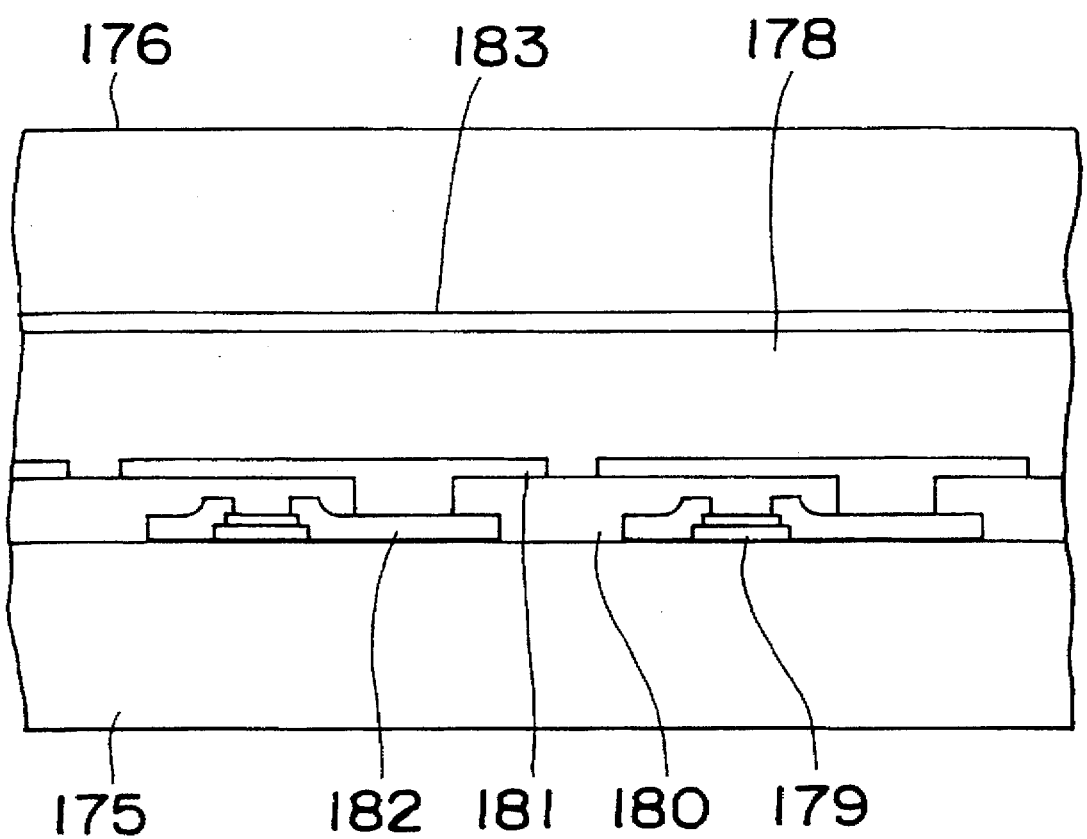
FIG. 14 is an enlarged fragmentary sectional view of a liquid crystal panel employed in the projection display system of FIG. 13.

The light valve 171 is constituted by a reflection type of liquid crystal panel 172, a plano-concave lens 173 and a positive lens 174. In the liquid crystal panel 172, a sealed space is defined by first and second glass substrates 175 and 176 and sealing compound 177. Polymer dispersion liquid crystal, serving as a liquid crystal layer 178, fills the sealed space. As shown in FIG. 14, TFTs 179 are formed in a matrix on the first glass substrate 175 and a pixel electrode 181 made of aluminum is provided, through an insulating layer 180, on each of the TFTs 179. The pixel electrode 181 is connected to a drain electrode 182 of each of the TFTs 179. A common electrode 183 is formed on the second glass substrate 176 and is a transparent and electrically conductive film.

The projection lens 184 is constituted by a first lens group 185 disposed adjacent to the liquid crystal panel 172 and a second lens group 186 disposed adjacent to the screen. A flat mirror 187 is provided between the first and second lens groups 185 and 186. After scattered light emitted from a pixel disposed at a center of an image plane of the liquid crystal panel 172 has been transmitted through the first lens group 185, about a half of the scattered light is incident upon the flat mirror 187 and the remainder is incident upon the second lens group 186 without being incident upon the flat mirror 187. A normal of the reflecting surface of the flat mirror 187 extends at an angle of 45° relative to an optical axis 188 of the projection lens 184. Light from the light source 70 is reflected by the flat mirror 187 so as to be transmitted through the first lens group 185 and then, is sequentially transmitted through the positive lens 174 and the plano-concave lens 173 so as to be incident upon the liquid crystal panel 172. Reflected light from the liquid crystal panel 172 is sequentially transmitted through the plano-concave lens 173, the positive lens 174, the first lens group 185 and the second lens group 186 so as to reach the screen. By combining the plano-concave lens 173 and the positive lens 174, the projection lens 184 projects an optical image, formed on the liquid crystal layer 178, onto the screen. Meanwhile, a telecentric system is employed such that a light ray proceeding from a center of a stop of the projection lens 184 towards the liquid crystal panel 172 is substantially perpendicularly incident upon the liquid crystal layer 178.

In the projection display system employing the polymer dispersion liquid crystal panel, scattering gain should be reduced so as to obtain excellent contrast of the projected image. In order to reduce the scattering gain, the liquid crystal layer may be made thicker. However, if the liquid crystal layer is made thicker, the voltage required for setting the liquid crystal layer to its transparent state becomes higher, so that output voltage of a drive IC is required to be increased and thus, the quantity of heat produced by the drive IC becomes extremely large. As a result, a problem arises in that the uniformity of the temperature of the liquid crystal layer cannot be secured, whereby the uniformity of image quality deteriorates.

When the liquid crystal panel is of a reflection type, light passes through the liquid crystal layer twice. Thus, in the reflection type of liquid crystal panel, scattering gain can be reduced as compared with a transmission type of liquid crystal panel including a liquid crystal layer having a thickness identical with that of the liquid crystal layer of the reflection type of liquid crystal panel. Therefore, regarding contrast of the projected image, the reflection type of liquid crystal panel is advantageous over the transmission type of liquid crystal panel. Namely, in the reflection type of liquid crystal panel, the projected image has excellent contrast because of a lower output voltage of the drive IC. Furthermore, in the arrangement of FIG. 13, since effects for improving contrast are created by the plano-concave lens 173 at both the input side and the output side of the liquid crystal panel 172, the contrast of the projected image is remarkably enhanced. Finally, it should be noted that the projection lens 184 in the arrangement of FIG. 13 may be modified by eliminating the positive lens 174 or replacing the plano-concave lens 173 with a thick transparent plate.

Figure 15:
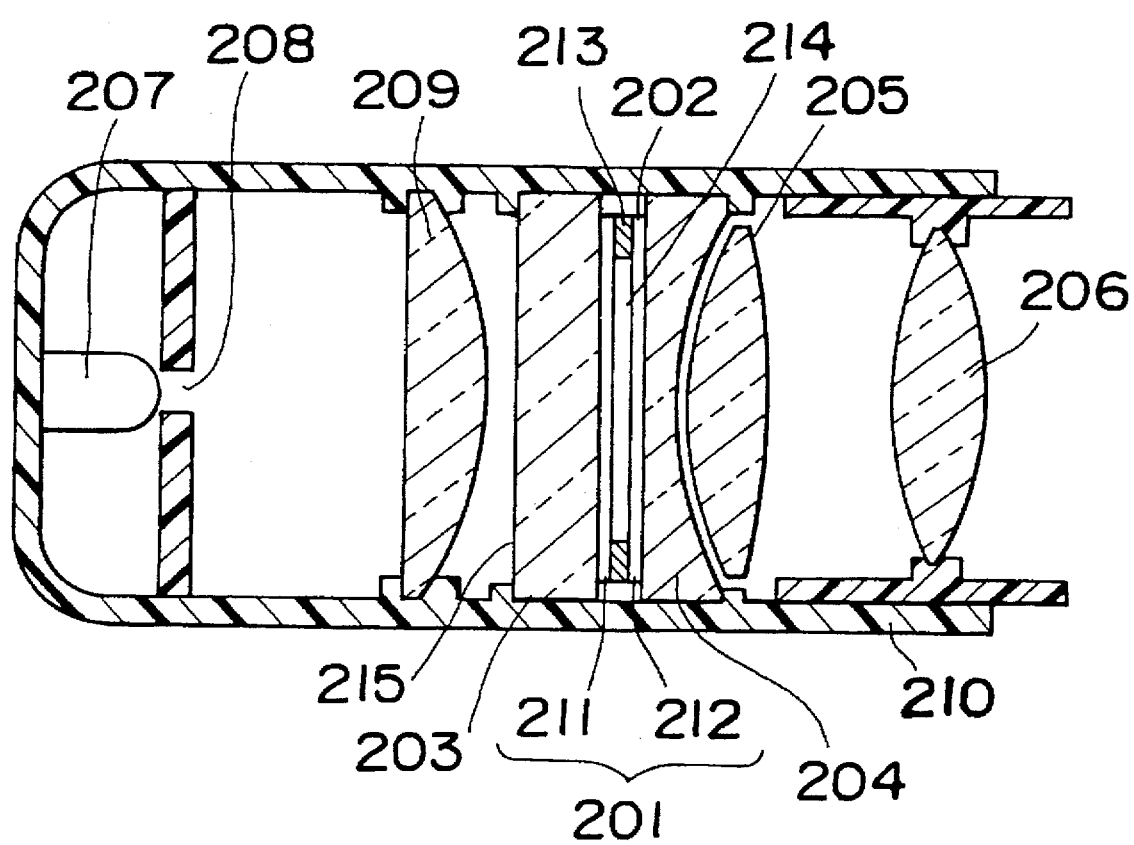
FIG. 15 is a sectional view, of a viewfinder of the present invention.

FIG. 15 shows a viewfinder system to which a light valve 201 of the present invention is applied. The light valve 201 includes a liquid crystal panel 202, a transparent plate 203, a plano-concave lens 204 and a positive lens 205. The liquid crystal panel 202 is formed by a polymer dispersion liquid crystal panel having a display image plane of 0.7 inch in diagonal. In the liquid crystal panel 202, a sealed space is defined by two glass substrates 211 and 212 and sealing compound 213 and polymer dispersion liquid crystal serving, as a liquid crystal layer 214, fills the sealed space. The glass substrates 211 and 212 each have a thickness of 1.1 mm. The transparent plate 203 is coupled with an input side of the liquid crystal panel 202 by using transparent adhesive, while the plano-concave lens 204 is coupled with an output side of the liquid crystal panel 204 by using transparent adhesive. The positive lens 205 is disposed at an output side of and in close vicinity to the plano-concave lens 204. In addition, an ocular 206 is provided at an output side of the positive lens 205. Black paint is coated on ineffective faces of the transparent plate 203 and the plano-concave lens 204, while anti-reflection coatings are deposited on effective areas of faces of the transparent plate 203 and the plano-concave lens 204, which faces are held in contact with air. By using the plano-concave lens 204, the positive lens 205 and the ocular 206 in combination, a virtual image corresponding to an optical image on the liquid crystal panel 202 is formed at a location disposed at a least distance of distinct vision when an observer places his or her eye near the ocular 206 and watches the virtual image through the ocular 206.

A lamp 207 is formed by a DC fluorescent lamp having a diameter of 7 mm and a length of 20 mm. Light diffused from the lamp 207 is converted by a pin hole 208 and a condenser lens 209 into light having a high degree of directivity and is transmitted through the transparent plate 203 so as to be incident upon the liquid crystal layer 214. At this time, since the distance from an input face 215 of the transparent plate 203 to the liquid crystal layer 214 is long, a decrease in contrast due to rear scattering is suppressed. Meanwhile, the plano-concave lens 204 disposed at the output side of the liquid crystal panel 202 suppresses a decrease in contrast caused by front scattered light. As a result, an image having excellent contrast can be obtained through the ocular 206. All of the above-mentioned constituent elements are accommodated in a housing 210. A light source having a small light radiator and high luminance, for example, an LED, a halogen lamp, a cathode-ray tube, etc. may be desirably used as the lamp 207. Meanwhile, any of the light valves shown in FIGS. 11(a) to 11(k) may be used because an image having excellent contrast can be obtained by any of the light valves of FIGS. 11(a) to 11(k).

Since the viewfinder system of the present invention does not employ a polarizer in the liquid crystal panel, its optical utilization efficiency is high. Therefore, when the viewfinder system is applied to a video camera, the viewfinder system may be used, after its batteries are charged, for a longer time than a viewfinder system employing a TN liquid crystal panel.

Figure 16:
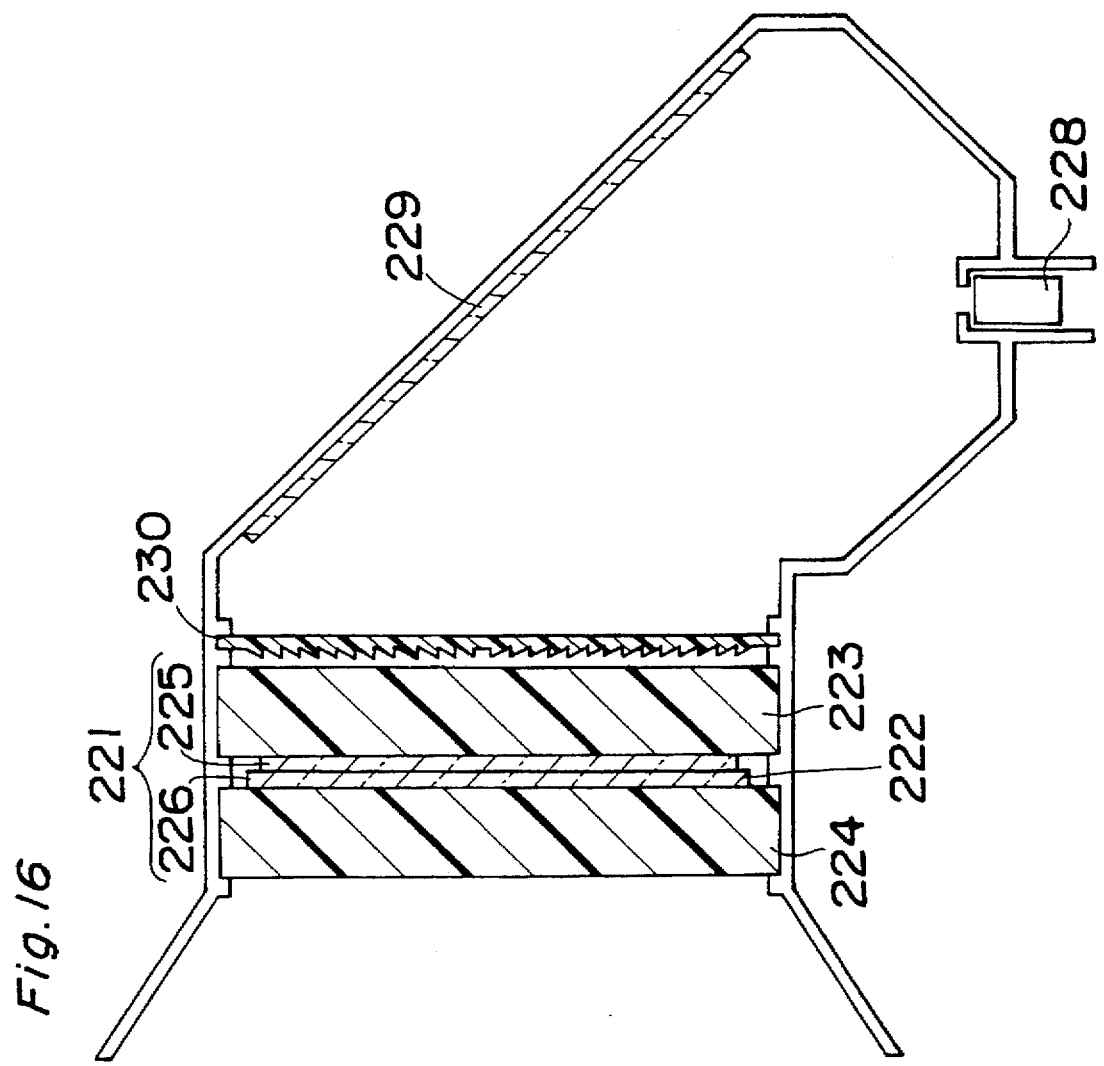
FIG. 16 is a schematic sectional view of a display system of the present invention.
Figure 17A:
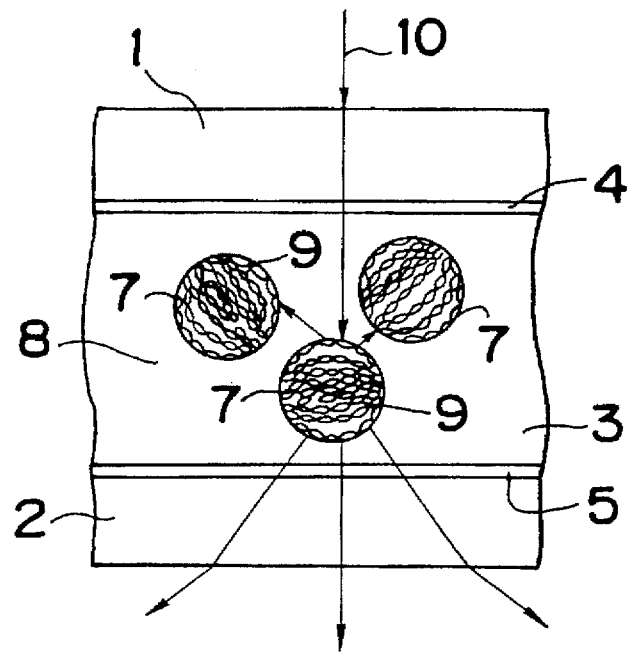
FIGS. 17(a) and 17(b) are schematic diagrams of a prior art polymer dispersion liquid crystal panel.
Figure 17B:
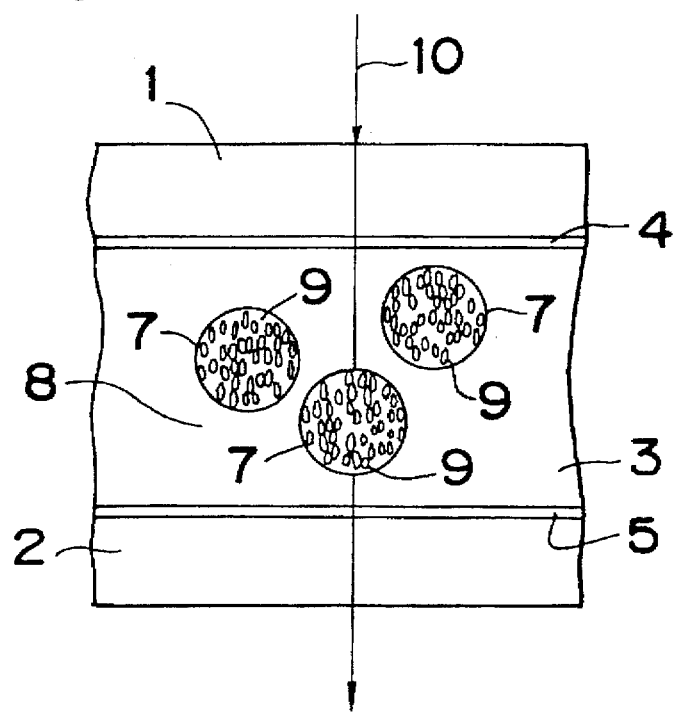
Figure 18:
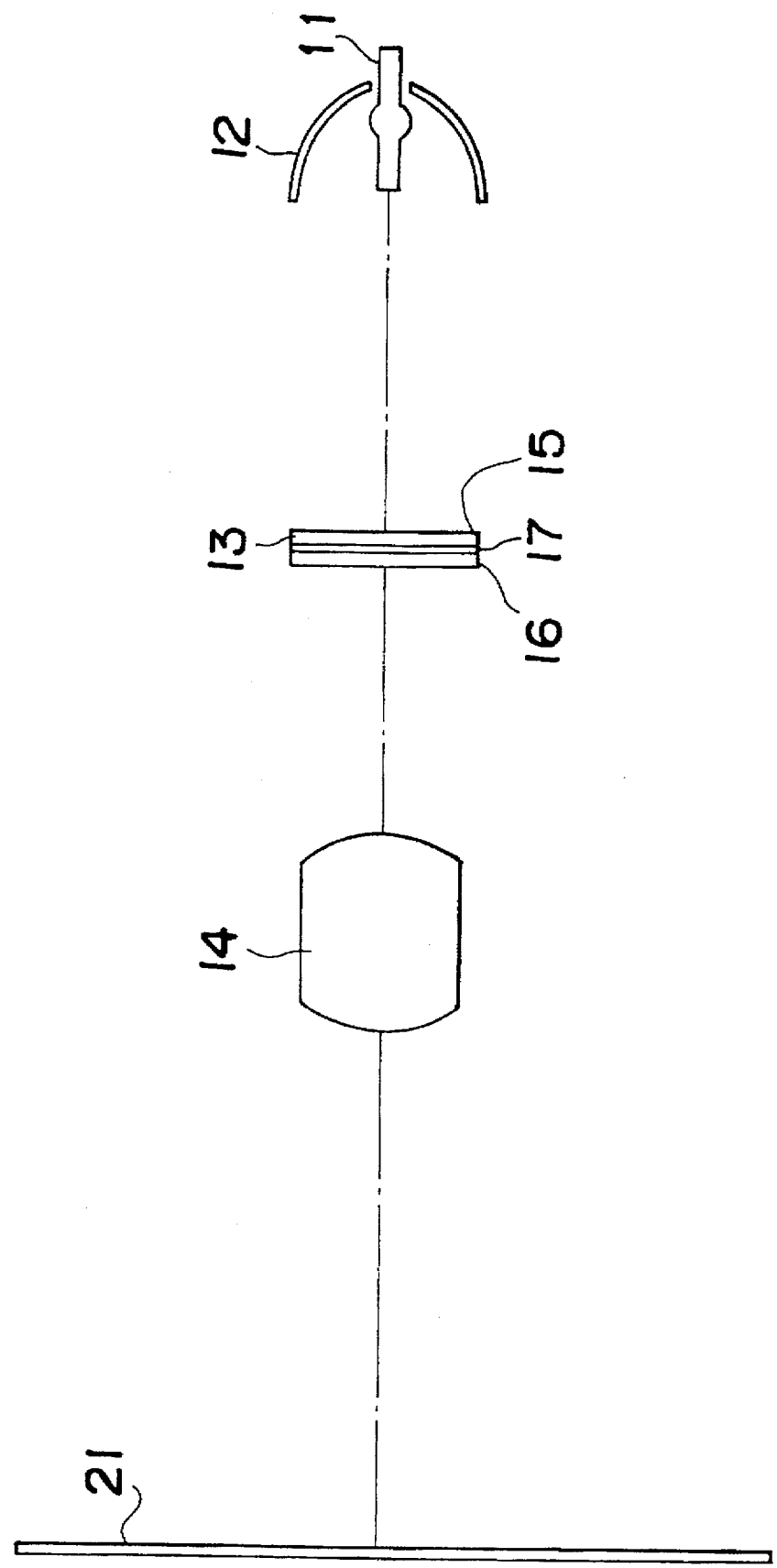
FIG. 18 is a schematic diagram of a prior art projection display system.

FIG. 16 shows a display system to which a light valves 221 of the present invention is applied. The light valve 221 is constituted by a liquid crystal panel 222 and two transparent plates 223 and 224. An effective display area of the liquid crystal panel 222 has a diagonal length of 10 inches. The liquid crystal panel 222 includes two transparent substrates 225 and 226 between which polymer dispersion liquid crystal is sandwiched as a liquid crystal layer (not shown). Although not specifically shown, transparent electrodes are provided in a matrix on one of opposite faces of each of the transparent substrates 225 and 226 adjacent to the liquid crystal layer. When voltage corresponding to an image signal is applied to the transparent electrodes, an optical image is formed, as variations in the ability of the liquid crystal layer to scatter light. Transparent plates 223 and 224 are, respectively, bonded to input and output sides of the liquid crystal panel 222 by transparent adhesive. Each of the transparent plates 223 and 224 has a thickness of 40 mm and is made of acrylic resin. Black paint is coated on ineffective faces of the transparent plates 223 and 224, while anti-reflection coatings are deposited on effective areas of faces of the transparent plates 223 and 224, which faces are held in contact with air.

A lamp 228 is formed by a DC fluorescent lamp having a diameter of 20 mm and a length of 40 mm. Light emitted from the lamp 228 is reflected by a flat mirror 229 and then, is converted by a Fresnel lens 230 into light having a high degree of directivity so as to be incident upon the light valve 221. Since the luminance of light outputted again from the liquid crystal layer can be suppressed by the two thick transparent plates 225 and 226, an image having excellent contrast is displayed on the liquid crystal panel 222.

In the display system, although the visual field angle is limited, a bright image having excellent contrast can be observed when viewed from a predetermined direction. Thus, the display system can be used for store displays.

In the foregoing embodiments of the present invention, the polymer dispersion liquid crystal panel is used as the light valve. In addition, any member which is capable of changing its light scattering state to form an optical image, for example, a thermal writing mode liquid crystal panel employing phase change liquid crystal, a liquid crystal panel employing ferroelectric liquid crystal, PLZT, etc. can also be used as the light invention.

As is clear from the foregoing description of the light valve of the present invention which can change its light scattering state to form an optical image, a bright image having excellent contrast can be obtained by making the transparent substrate thick or combining the transparent plate or the plano-concave lens with the transparent substrate. Further, by using this light valve, display systems such as a projection display system and a viewfinder system, become capable of displaying a bright image having excellent contrast.

What is claimed is:

1. A light valve comprising:
   a light valve layer, capable of undergoing changes in state by which an ability of the layer to scatter incident light changes, for forming an optical image based on said state; and
   two substrate between which said light valve layer is sandwiched and at least one of which is transparent; and
   satisfying the following condition:

$$t \geq \frac{d}{4} \sqrt{n^2 - 1}$$

wherein t denotes the thickness of said at least one of said substrates at the center thereof, n denotes a refractive index of said at least one of said substrates and d denotes a maximum diameter of an effective display area of said light valve layer.

2. A light valve as claimed in claim 1, and further comprising:
   light absorbing means for absorbing light, said light absorbing means being provided on a portion of said at least one of said substrates.

3. A light valve as claimed in claim 1, and further comprising:
   anti-reflection means for inhibiting the reflection of light, said anti-reflection means being provided on one of opposite faces of said at least one of said substrates, which face is remote from said light valve layer.

4. A light valve as claimed in claim 1, wherein one of opposite faces of said at least one of said substrates, which face is remote from said light valve layer, has a concave surface.

5. A light valve as claimed in claim 4, and further comprising:
   a positive lens which is provided in close vicinity to said concave surface.

6. A light valve as claimed in claim 1, and further comprising:
   reflection means for reflecting light, said reflection means being provided between one of said substrates and said light valve layer.

7. A light valve comprising:
   a light valve layer, capable of undergoing changes in state by which an ability of the layer to scatter incident light changes, for forming an optical image based on said state;
   two substrates between which said light valve layer is sandwiched and at least one of which is transparent;
   a transparent plate having a uniform refractive index and confronting said at least one of said substrates;
   a transparent body optically coupling said at least one of said substrates and said transparent plate; and
   wherein said light valve is light-transmissive between a face of the other of said substrates remote from said light valve layer and a face of said transparent plate remote from said transparent body.

8. A light valve as claimed in claim 7, and satisfying the following condition:

$$t \geq \frac{d}{4} \sqrt{n^2 - 1}$$

wherein t denotes a central thickness from said face of said transparent plate to said light valve layer, n denotes a refractive index of said transparent plate and d denotes a maximum diameter of an effective display area of said light valve layer.

9. A light valve as claimed in claim 7, and further comprising:
   light absorbing means for absorbing light, said light absorbing means being provided on a portion of one of said transparent plate and said transparent body.

10. A light valve as claimed in claim 7, and further comprising:
    anti-reflection means for inhibiting the reflection of light, said anti-reflection means being provided on a portion of said face of said transparent plate which is remote from said transparent body.

11. A light valve as claimed in claim 7, wherein said face of said transparent plate which is remote from said transparent body has a concave surface.

12. A light valve apparatus as claimed in claim 11, and further comprising:
    a positive lens which is provided in close vicinity to said concave surface.

13. A light valve as claimed in claim 7, and further comprising:
    reflection means for reflecting light, said reflection means being provided between one of said substrates and said light valve layer.

14. A projection display system comprising:
    a light source;
    a light valve which receives light emitted from said light source,
    said light valve including a light valve layer, capable of undergoing changes in state by which an ability of the light valve layer to scatter light changes, for forming an optical image based on said state and two substrates between which said light valve layer is sandwiched and at least one of which is transparent;
    said light valve satisfying the following condition:

$$t \geq \frac{d}{4} \sqrt{n^2 - 1}$$

wherein t denotes a central thickness of said at least one of said substrates, n denotes a refractive index of said at least one of said substrates and d denotes a maximum diameter of an effective display area of said light valve layer; and
    a projection lens disposed downstream from the light valve with respect to the optical path of the display system so as to project the optical image.

15. A projection display system as claimed in claim 14, and further comprising:
    light absorbing means for absorbing light, said light absorbing means being provided on a portion of said at least one of said substrates.

16. A projection display system as claimed in claim 14, and further comprising:
    anti-reflection means for inhibiting the reflection of light, said anti-reflection means being provided on an effective area of a face of said at least one of said substrates, which face is held in contact with air.

17. A projection display system as claimed in claim 14, wherein one of opposite faces of said at least one of said substrates remote from said light valve layer has a concave surface.

18. A projection display system as claimed in claim 17, and further comprising:
a positive lens which is provided in close vicinity to said concave surface.

19. A projection display system as claimed in claim 14, and further comprising:
reflection means for reflecting light, said reflection means being provided between one of said substrates and said light valve layer.

20. A projection display system comprising:
a light source;
a light valve which receives light emitted from said light source,
said light valve including a light valve layer, capable of undergoing changes in state by which an ability of the layer to scatter incident light changes, for forming an optical image based on said state, two substrates between which said light valve layer is sandwiched and at least one of which is transparent, a transparent plate which has a uniform refractive index and confronts said at least one of said substrates, and a transparent body optically coupling said at least one of said substrates and said transparent plate;
wherein said light valve is light-transmissive between a face of the other of said substrates remote from said light valve layer and a face of said transparent plate remote from said transparent body; and
a projection lens disposed downstream from the light valve with respect to the optical path of the display system so as to project the optical image.

21. A projection display system as claimed in claim 20, satisfying the following condition:

$$t \geq \frac{d}{4} \sqrt{n^2 - 1}$$

wherein t denotes a central thickness from said face of said transparent plate to said light valve layer, n denotes a refractive index of said transparent plate and d denotes a maximum diameter of an effective display area of said light valve layer.

22. A projection display system as claimed in claim 20, and further comprising:
light absorbing means for absorbing light, said light absorbing means being provided on a portion of one of said transparent plate and said transparent body.

23. A projection display system as claimed in claim 20, and further comprising:
anti-reflection means for inhibiting the reflection of light, said anti-reflection means being provided on a portion of said face of said transparent plate which is remote from said transparent body.

24. A projection display system as claimed in claim 20, wherein said face of said transparent plate which is remote from said transparent body has a concave surface.

25. A projection display system as claimed in claim 24, and further comprising:
a positive lens which is provided in close vicinity to said concave surface.

26. A projection display system as claimed in claim 20, and further comprising:
reflection means for reflecting light, said reflection means being provided between one of said substrates and said light valve layer.

27. A viewfinder system comprising:
a light source;
a light valve which receives light emitted from said light source,
said light valve including a light valve layer, capable of undergoing changes in state by which an ability of the light valve layer to scatter light changes, for forming an optical image based on said state and two substrates between which said light valve layer is sandwiched and at least one of which is transparent;
said light valve satisfying the following condition:

$$t \geq \frac{d}{4} \sqrt{n^2 - 1}$$

wherein t denotes a central thickness of said at least one of said substrates, n denotes a refractive index of said at least one of said substrates and d denotes a maximum diameter of an effective display area of said light valve layer; and
a magnifying lens for forming a virtual image of the optical image.

28. A viewfinder system as claimed in claim 27, and further comprising:
light absorbing means for absorbing light, said light absorbing means being provided on a portion of said at least one of said substrates.

29. A viewfinder as claimed in claim 27, and further comprising:
anti-reflection means for inhibiting the reflection of light, said anti-reflection means being provided on an effective area of a face of said at least one of said substrates, which face is held in contact with air.

30. A viewfinder system as claimed in claim 27, wherein one of opposite faces of said at least one of said substrates remote from said light valve layer has a concave surfaces.

31. A viewfinder system as claimed in claim 30, and further comprising:
a positive lens which is provided in close vicinity to said concave surface.

32. A viewfinder system comprising:
a light source;
a light valve which receives light emitted from said light source,
said light valve including a light valve layer, capable of undergoing changes in state by which an ability of the light valve layer to scatter light changes, for forming an optical image based on said state and two substrates between which said light valve layer is sandwiched and at least one of which is transparent, a transparent plate which has a uniform refractive index and confronts said at least one of said substrates, and a transparent body optically coupling said at least one of said substrates and said transparent plate;
wherein said light valve is light-transmissive between a face of the other of said substrates remote from said light valve layer and a face of said transparent plate remote from said transparent body; and
a magnifying lens for forming a virtual image of the optical image.

33. A viewfinder system as claimed in claim 32, and satisfying the following condition:

$$t \geq \frac{d}{4} \sqrt{n^2 - 1}$$

wherein t denotes a central thickness from said face of said transparent plate in contact with air to said light valve layer, n denotes a refractive index of said transparent plate and d denotes a maximum diameter of an effective display area of said light valve layer.

34. A viewfinder system as claimed in claim 32, and further comprising:
light absorbing means for absorbing light, said light absorbing means being provided on a portion of one of said transparent plate and said transparent body.

35. A viewfinder system as claimed in claim 32, and further comprising:
anti-reflection means for inhibiting the reflection of light, said anti-reflection means being provided on a portion of said face of said transparent plate which is remote from said transparent body.

36. A viewfinder system as claimed in claim 32, wherein said face of said transparent plate which is remote from said transparent body has a concave surface.

37. A viewfinder system as claimed in claim 36, and further comprising:
a positive lens which is provided in close vicinity to said concave surface.

38. A display system comprising:
a light source; and
a light valve which receives light emitted from said light source,
said light valve including a light valve layer, capable of undergoing changes in state by which an ability of the light valve layer to scatter light changes, for forming an optical image based on said state and two substrates between which said light valve layer is sandwiched and at least one of which is transparent;
said light valve satisfying the following condition:

$$t \geq \frac{d}{4} \sqrt{n^2 - 1}$$

wherein t denotes a central thickness of said at least one of said substrates, n denotes a refractive index of said at least one of said substrates and d denotes a maximum diameter of an effective display area of said light valve layer.

39. A display system as claimed in claim 38, and further comprising:
light absorbing means for absorbing light, said light absorbing means being provided on a portion of said at least one of said substrates.

40. A display system as claimed in claim 38, and further comprising:
anti-reflection means for inhibiting the reflection of light, said anti-reflection means being provided on an effective area of a face of said at least one of said substrates, which face is held in contact with air.

41. A display system as claimed in claim 38, wherein one of opposite faces of said at least one of said substrates remote from said light valve layer has a concave surface.

42. A display system as claimed in claim 41, and further comprising:
a positive lens which is provided in close vicinity to said concave surface.

43. A display system comprising:
a light source; and
a light valve which receives light emitted from said light source,
said light valve including a light valve layer, capable of undergoing changes in state by which an ability of the layer to scatter incident light changes, for forming an optical image based on said state, two substrates between which said light valve layer is sandwiched and at least one of which is transparent, a transparent plate which has a uniform refractive index and confronts said at least one of said substrates, and a transparent body optically coupling said at least one of said substrates and said transparent plate;
wherein said light valve is light-transmissive between a face of the other of said substrates remote from said light valve layer and a face of said transparent plate remote from said transparent body.

44. A display system as claimed in claim 43, and satisfying the following condition:

$$t \geq \frac{d}{4} \sqrt{n^2 - 1}$$

wherein t denotes a central thickness from said face of said transparent plate in contact with air to said light valve layer, n denotes a refractive index of said transparent plate and d denotes a maximum diameter of an effective display area of said light valve layer.

45. A display system as claimed in claim 43, and further comprising:
light absorbing means for absorbing light, said light absorbing means being provided on a portion of one of said transparent plate and said transparent body.

46. A display system as claimed in claim 43, and further comprising:
anti-reflection means for inhibiting the reflection of light, said anti-reflection means being provided on a portion of said face of said transparent plate which is remote from said transparent body.

47. A display system as claimed in claim 43, wherein said face of said transparent plate which is remote from said transparent body has a concave surface.

48. A display system as claimed in claim 47, and further comprising:
a positive lens which is provided in close vicinity to said concave surface.

49. A projection display system comprising:
a light source;
a light valve which receives light emitted from said light source so as to form an optical image based on a light scattering state of said light valve; and
a projection lens for projecting the optical image from said light valve onto a screen;
wherein said light valve comprises:
a light valve layer capable of undergoing changes in the light scattering state of the layer, by which an ability of the layer to scatter incident light changes, in order to form the optical image based on the light scattering state, two substrates between which said light valve layer is sandwiched, at least one of said substrates being transparent and comprising a matrix type electrode, a transparent plate that has a uniform refractive index and is disposed so as to confront said at least one of said substrates, a light absorbing means for absorbing light provided at a portion of said at least one of said substrates such that effective light does not pass through said portion, and a transparent body optically coupling said at least one of said substrates and said transparent plate.

50. The projection display system of claim 49, wherein said transparent plate has opposite faces, one of said opposite faces is remote from said light valve layer and said one of said opposite faces has a curved surface.

* * * * *